United States Patent
Kakuta et al.

(10) Patent No.: US 12,080,166 B2
(45) Date of Patent: Sep. 3, 2024

(54) VEHICLE TRACKING SYSTEM

(71) Applicant: Mitsubishi Electric Corporation, Tokyo (JP)

(72) Inventors: Takatoshi Kakuta, Tokyo (JP); Toshihide Satake, Tokyo (JP); Keisuke Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 43 days.

(21) Appl. No.: 18/159,770

(22) Filed: Jan. 26, 2023

(65) Prior Publication Data
US 2024/0153384 A1    May 9, 2024

(30) Foreign Application Priority Data
Nov. 9, 2022 (JP) .................................. 2022-179238

(51) Int. Cl.
*G08G 1/14* (2006.01)
*B60W 40/10* (2012.01)

(52) U.S. Cl.
CPC ............. *G08G 1/146* (2013.01); *B60W 40/10* (2013.01); *G08G 1/148* (2013.01); *B60W 2300/14* (2013.01); *B60W 2554/4041* (2020.02)

(58) Field of Classification Search
CPC ........ G08G 1/146; G08G 1/148; B60W 40/10; B60W 2300/14; B60W 2554/4041
See application file for complete search history.

(56) References Cited

U.S. PATENT DOCUMENTS

| 10,636,305 B1* | 4/2020 | Schmidt | G08G 1/143 |
| 2003/0233189 A1* | 12/2003 | Hsiao | G01C 21/26 |
| | | | 340/988 |
| 2014/0039987 A1* | 2/2014 | Nerayoff | G06V 20/56 |
| | | | 348/148 |

FOREIGN PATENT DOCUMENTS

JP    2006-515696 A    6/2006

* cited by examiner

*Primary Examiner* — Rufus C Point
(74) *Attorney, Agent, or Firm* — Sughrue Mion, PLLC; Richard C. Turner

(57) ABSTRACT

The vehicle tracking system includes a vehicle tracking sensor system that provides a tentative vehicle number to a vehicle detected by a sensor and outputs a signal including the tentative vehicle number, absolute-coordinate-system positional information of the detected vehicle, and edge computing that replaces the tentative vehicle number by a vehicle number outputted from a vehicle number management PC, when the vehicle completes parking.

20 Claims, 17 Drawing Sheets

VEHICLE TRACKING SYSTEM

BACKGROUND OF THE INVENTION

Field of the Invention

The present disclosure relates to a vehicle tracking system.

Description of the Related Art

Cargo transportation by a trailer towed by a tractor occupies important part of the world commerce. In the present disclosure, a trailer means a cargo-vehicle portion on which cargoes are mounted; a tractor means a vehicle for towing the trailer.

In recent years, there has been expanding the demand of business typified by E-Commerce (Electronic Commerce) in which commodities such as a consumer electrical appliance and food or services are merchandized on the Internet.

Meanwhile, in some cases, because drivers for transporting or delivering commodities are lacking and it cannot sufficiently be performed to identify or manage trailers that are traveling or parked in a distribution facility, it takes a long time for a driver to find a target trailer and it is not made possible to effectively load a trailer with articles. Accordingly, the distribution members or the drivers in charge of these works are obliged to work long hours, and the solution therefor is a social issue; thus, there have been developed various technologies for solving such an issue.

For example, in a conventional trailer tracking system disclosed in Patent Document 1, a navigation system for obtaining positional information and an RFID (Radio Frequency Identifier) reader are mounted in a tractor and an RFID tag is mounted in a trailer. Then, by use of a PC (Personal Computer) provided in a remote monitoring room, the RFID-tag information and the trailer positional information are received through a WAN (Wide Area Network) such as the Internet or a public network, so that the trailer is identified and hence the present position thereof can be comprehended.

PRIOR ART REFERENCE

Patent Document

[Patent Document 1] National Publication of International Patent Application No. 2006-515696

SUMMARY OF THE INVENTION

In the conventional trailer tracking system disclosed in Patent Document 1, it is required that a RFID reader is preliminarily mounted in a tractor and a RFID tag is mounted in a trailer; therefore, there has been a problem that the application range of the position tracking system is limited. Moreover, there has been a problem that in a tractor in which no RFID reader is mounted or in a trailer in which no RFID tag is mounted, it is required to add hardware or to perform modification work, for example, attaching a RFID reader or a RFID tag.

Moreover, in the conventional trailer tracking system disclosed in Patent Document 1, although respective RFID readers are provided at the entrance and the exit of a distribution facility so that entering and leaving by a trailer is managed, it is a precondition that a RFID tag is mounted in the trailer; thus, there has been a problem that when no RFID tag is mounted in the trailer, entering and leaving by the trailer cannot be managed. Furthermore, there has been a problem that when there exists an abnormality in the communication between the RFID reader and the RFID tag or when there exists an abnormality in the communication between a PC in the remote monitoring room and the RFID reader, no countermeasures are taken into consideration.

The present disclosure discloses a technology for solving the foregoing problems in a conventional vehicle tracking system; the objective thereof is to provide a vehicle tracking system in which even when a defect occurs in a sensor or the system, a vehicle can be identified without adding hardware to a trailer or modifying the trailer.

A vehicle tracking system disclosed in the present disclosure tracks a vehicle existing in a predetermined facility and includes a vehicle tracking sensor system that has a sensor for detecting the vehicle, provides a tentative vehicle number to the vehicle detected by the sensor, and then outputs a signal including the tentative vehicle number and absolute-coordinate-system positional information of the detected vehicle, a vehicle number management PC to which a vehicle number possessed by the vehicle is inputted, and edge computing that replaces the tentative vehicle number outputted from the vehicle tracking sensor system by the vehicle number outputted from the vehicle number management PC, when the vehicle completes parking; the vehicle tracking system is characterized in that the edge computing outputs a signal including the replaced vehicle number of the vehicle that has completed parking and the absolute-coordinate-system positional information of the vehicle.

Moreover, a vehicle tracking system disclosed in the present disclosure tracks a vehicle existing in a predetermined facility and includes a vehicle tracking sensor system that has a sensor counter that counts up every predetermined period and a sensor for detecting the vehicle, provides a tentative vehicle number to a vehicle detected by the sensor, and then outputs a signal including the tentative vehicle number, absolute-coordinate-system positional information of the detected vehicle, and counter information indicating a counting state of the sensor counter, a vehicle number management PC to which a vehicle number possessed by the vehicle is inputted, a system-abnormal-time vehicle number inputting PC to which a vehicle number possessed by the vehicle and absolute-coordinate-system positional information of the vehicle are inputted at a system abnormality time when an abnormality occurs in the vehicle tracking sensor system, and edge computing that replaces, at the system abnormality time, the tentative vehicle number outputted from the vehicle tracking sensor system by the vehicle number outputted from the system-abnormal-time vehicle number inputting PC; the vehicle tracking system is characterized in that the edge computing outputs a signal including the replaced vehicle number and the absolute-coordinate-system positional information of the vehicle.

Furthermore, a vehicle tracking system disclosed in the present disclosure tracks a vehicle existing in a predetermined facility and includes a vehicle tracking sensor system that has a sensor counter that counts up every predetermined period and a sensor for detecting the vehicle, provides a tentative vehicle number to a vehicle detected by the sensor, and then outputs a signal including the tentative vehicle number, absolute-coordinate-system positional information of the detected vehicle, and counter information indicating a counting state of the sensor counter, a vehicle number management PC to which a vehicle number possessed by the vehicle is inputted, a system-abnormal-time vehicle number inputting PC to which a vehicle number possessed by the vehicle and absolute-coordinate-system positional information of the vehicle are inputted at a system abnormality time when an abnormality occurs in the vehicle tracking sensor system, and edge computing that replaces the tentative vehicle number included in a signal outputted from the vehicle tracking sensor system by the vehicle number included in a signal outputted from the vehicle number management PC, at a time when parking of the vehicle is completed, and that replaces the tentative vehicle number included in a signal outputted from the vehicle tracking sensor system by the vehicle number included in a signal outputted from the system-abnormal-time vehicle number inputting PC, at a time of the system abnormality; the vehicle tracking system is characterized in that the edge computing outputs a signal including the replaced vehicle number and the absolute-coordinate-system positional information of the vehicle.

The present disclosure makes it possible to obtain a vehicle tracking system that can identify a trailer without adding hardware to the trailer or modifying the trailer, even when a defect occurs in the sensor or the system.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
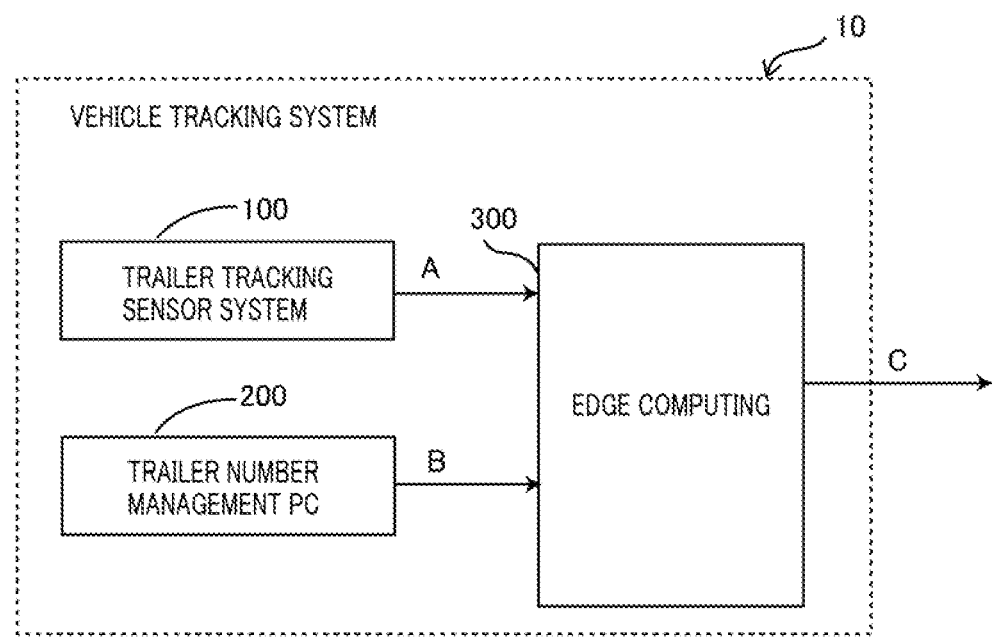
FIG. 1 is a block diagram representing the overall configuration of a vehicle tracking system according to Embodiment 1.

Hereinafter, a vehicle tracking system according to the present disclosure will be explained with reference to the drawings. In addition, in each of the drawings, the same reference characters denote the same or similar constituent elements.

Embodiment 1

FIG. 1 is a block diagram representing the overall configuration of a vehicle tracking system according to Embodiment 1. In FIG. 1, a vehicle tracking system 10 has a trailer tracking sensor system 100, as a vehicle tracking sensor system, a trailer number management PC (Personal Computer) 200, as a vehicle number management PC situated at the entrance of a distribution facility as a predetermined area, and edge computing 300. The trailer tracking sensor system 100 detects one or more trailers, as vehicles, existing in the distribution facility.

Edge computing is a network technology for processing data at a periphery (edge) portion of a computer network. The edge computing 300 in the vehicle tracking system 10 according to Embodiment 1 is configured with a PC provided with a controller unit including a CPU (Central Processing Unit) and performs communication with the trailer tracking sensor system 100 and with the trailer number management PC 200. The communication in the present embodiment means LTE (Long Term Evolution) or 5G (5th Generation: the 5th generation mobile communication system); a constant communication speed is secured.

Figure 18:
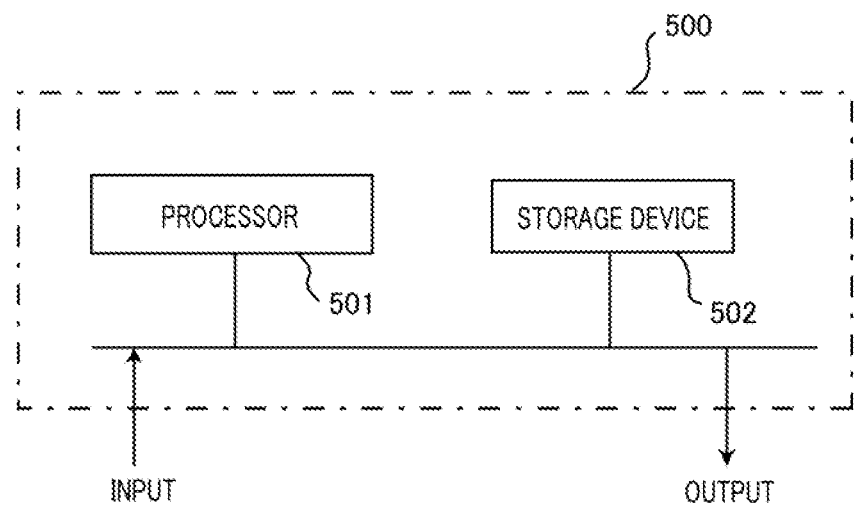
FIG. 18 is a block diagram representing the hardware configuration of a control unit included in the edge computing in each of Embodiments 1 and 2.

FIG. 18 is a block diagram representing the hardware configuration of a control unit included in the edge computing in each of Embodiments 1 and 2. As represented in FIG. 18, a control unit 500 included in the edge computing 300 has a processor 501 and a storage apparatus 502. Although not illustrated, the storage apparatus 502 has a volatile storage device such as a random access memory and a nonvolatile auxiliary storage device such as a flash memory. The processor 501 executes a program inputted from the storage apparatus 502. In this case, the program is inputted from the auxiliary storage device to the processor 501 by way of the volatile storage device. Moreover, the processor 501 may output data such as a calculation result either to the volatile storage device of the storage apparatus 502 or to the auxiliary storage device by way of volatile storage device.

In FIG. 1, in order to detect all traveling roads in the distribution facility, the trailer tracking sensor system 100 is provided with a great number of sensor poles, as sensors. The respective setting positions of the sensor poles are preliminarily measured by use of a high-accuracy GNSS (Global Navigation Satellite System) receiver. In the present embodiment, the setting position of the sensor pole is determined based on the latitude, the longitude, the altitude, and the azimuth.

Each of all the sensor poles provided in the trailer tracking sensor system 100 outputs a count value of a sensor counter. The sensor counter counts up by 1 every calculation period; when reaching a preliminarily set memory number, the count value returns to "0".

In order to detect trailers traveling in the distribution facility, the trailer tracking sensor system 100 includes a LiDAR (Light Detection and Ranging), a camera, and a millimeter wave radar. The camera is utilized for distinguishing a trailer from other obstacles such as a human, a passenger car, and an animal. In addition, an infra-red camera may be utilized in accordance with the environment around the distribution facility.

The trailer tracking sensor system 100 outputs a signal A including a trailer number, as a tentative vehicle number for a detected trailer, absolute-coordinate-system positional information of the detected trailer, and a count value, as counter information of a sensor counter.

The trailer number management PC 200 is installed at the entrance reception of the distribution facility. A receptionist inputs numerals or alphabets printed on the housing of a trailer entering from the outside of the distribution facility into the inside of the distribution facility, as the trailer number information, to the trailer number management PC 200. The trailer number management PC 200 outputs a signal B including an inputted trailer number.

The edge computing 300 is configured with a PC provide in a remote monitoring room or the like and receives the signal A from the trailer tracking sensor system 100 and the signal B from the trailer number management PC 200; then, based on these inputted signal A and signal B, the edge computing 300 outputs a signal C including the trailer number of a trailer detected by the trailer tracking sensor system 100 and the absolute-coordinate-system positional information of the trailer. The signal C is the output of the vehicle tracking system 10.

Figure 2:
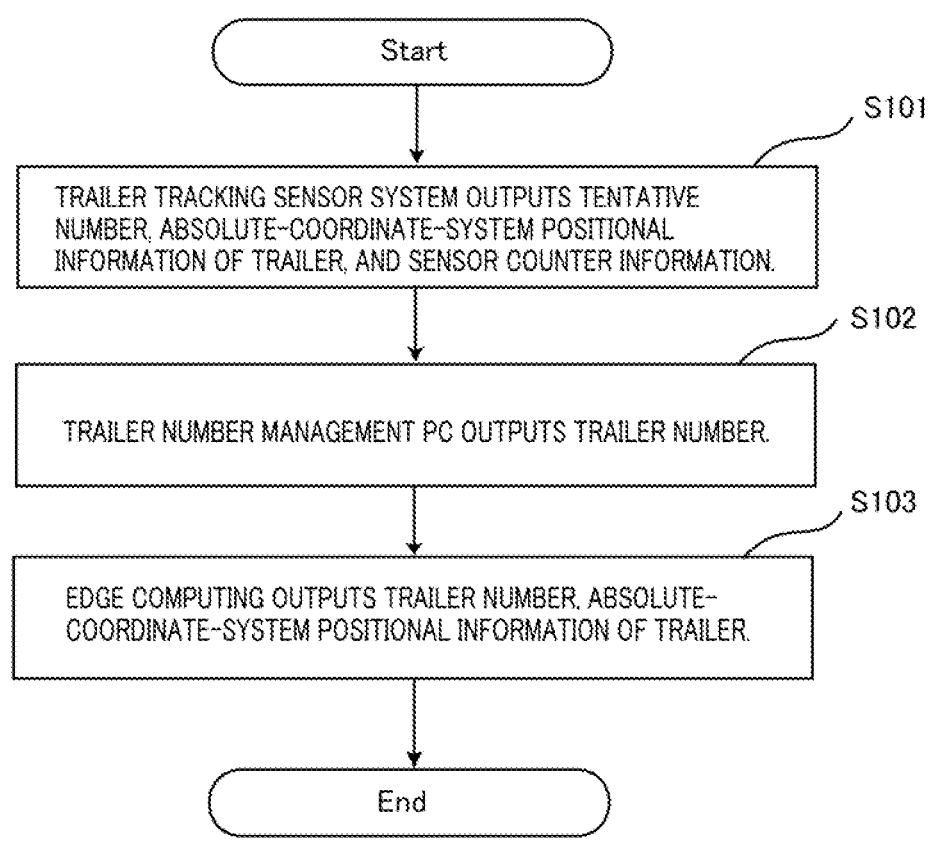
FIG. 2 is a flowchart representing the operation of the vehicle tracking system according to Embodiment 1.

FIG. 2 is a flowchart representing the operation of the vehicle tracking system according to Embodiment 1. In FIG. 2, at first, in the step S101, the trailer tracking sensor system 100 detects a trailer in the distribution facility and then outputs the signal A including the tentative trailer number of the detected trailer, the absolute-coordinate-system positional information of the detected trailer, and the count information of the sensor counter.

Only when detecting a trailer, the trailer tracking sensor system 100 outputs the tentative trailer number and the absolute-coordinate-system positional information of the trailer. In contrast, when detecting an obstacle other than a trailer, the trailer tracking sensor system 100 makes the tentative trailer number and the absolute-coordinate-system positional information of the detected trailer become ineffective values. In this situation, the absolute-coordinate-system positional information of the detected trailer means the latitude, the longitude, the altitude, and the azimuth.

Moreover, the trailer tracking sensor system 100 provides a tentative trailer number to each of detected trailers. The tentative trailer number to be provided is not particularly restricted; for example, the tentative trailer number is formed of a numeral that is counted up by 1 from "1".

Next, in the step S102, the trailer number management PC 200 outputs the signal B including a trailer number that has been inputted therein.

At last, in the step S103, as described later, the edge computing 300 outputs the signal C including the trailer number of a trailer that has completed perking and the absolute-coordinate-system positional information of the trailer.

Figure 3:
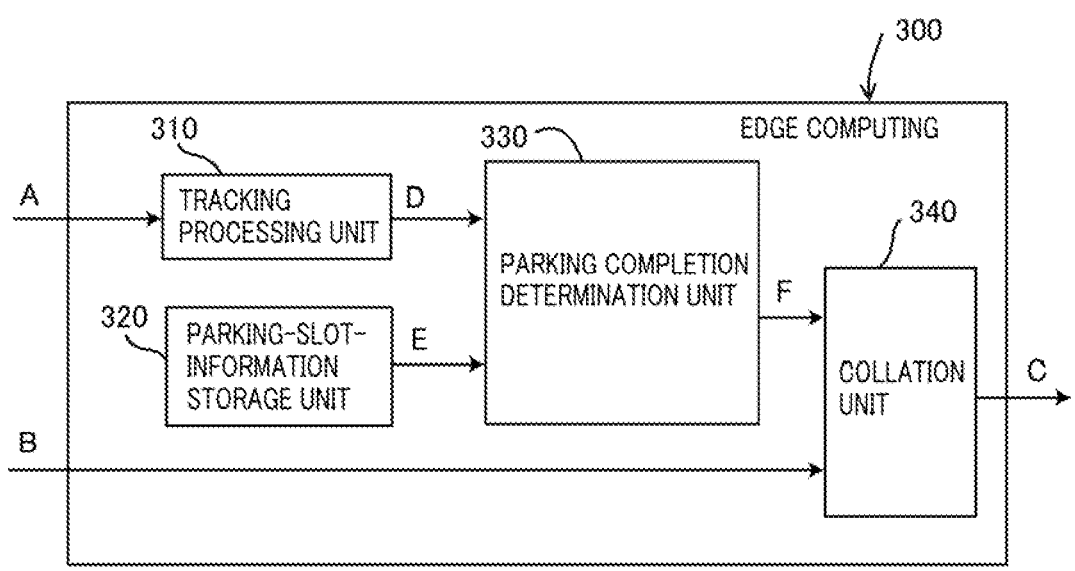
FIG. 3 is a block diagram representing the configuration of edge computing in the vehicle tracking system according to Embodiment 1.

Next, the configuration and the operation of the edge computing 300 according to Embodiment 1 will be explained. FIG. 3 is a block diagram representing the configuration of the edge computing in the vehicle tracking system according to Embodiment 1. In FIG. 3, the edge computing 300 includes a tracking processing unit 310, a parking-slot-information storage unit 320, a parking completion determination unit 330, and a collation unit 340.

The signal A from the trailer tracking sensor system 100 is inputted to the tracking processing unit 310; based on the inputted signal A, the tracking processing unit 310 tracks a detected trailer and then outputs a signal D. In the present embodiment, the signal D to be outputted from the tracking processing unit 310 is a signal including the tentative trailer number of a trailer detected by the trailer tracking sensor system 100, the absolute-coordinate-system positional information of the trailer, and an after-mentioned tracking flag.

The parking-slot-information storage unit 320 outputs a signal E including the positional information of each of parking slots. The parking completion determination unit 330 receives the signal D from the tracking processing unit 310 and the signal E from the parking-slot-information storage unit 320 and then determines whether or not a trailer has completed parking in a parking slot; in the case where the parking has been completed, the parking completion determination unit 330 outputs a signal F including a parking completion flag, the tentative trailer number of the trailer that has completed the parking, and the absolute-coordinate-system positional information of the trailer that has completed the parking.

The collation unit 340 collates the signal F from the parking completion determination unit 330 with the signal B from the trailer number management PC 200 and then outputs the signal C including the trailer number of the trailer that has completed the parking and the absolute-coordinate-system positional information of the trailer that has completed the parking. In this situation, the signal C to be outputted from the collation unit 340 is the signal C to be outputted from the foregoing edge computing 300 represented in FIG. 1, i.e., the signal C to be outputted from the vehicle tracking system 10.

Figure 4:
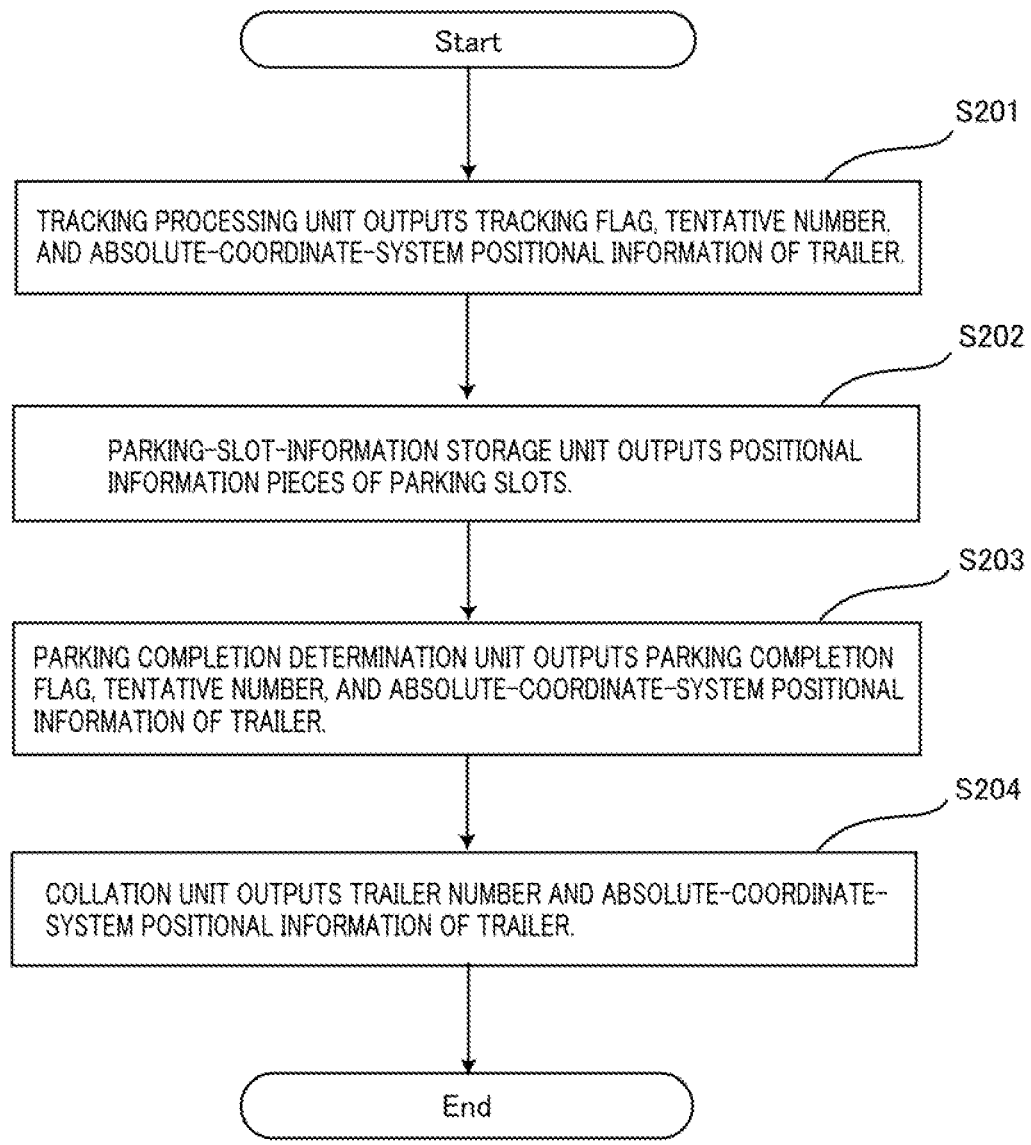
FIG. 4 is a flowchart representing the operation of the edge computing in the vehicle tracking system according to Embodiment 1.

FIG. 4 is a flowchart representing the operation of the edge computing in the vehicle tracking system according to Embodiment 1. In FIG. 4, at first, in the step S201, based on the tentative trailer number of a detected trailer, included in the signal A inputted from the trailer tracking sensor system 100, the absolute-coordinate-system positional information of the trailer, and the counter information of the sensor, the tracking processing unit 310 continuously collects information such as data transition and monitors these information pieces so as to track the detected trailer.

The tracking processing unit 310 outputs the signal D including the tracking flag, the tentative trailer number, and the absolute-coordinate-system positional information of the trailer that is being tracked. In the present embodiment, in the tracking processing by the tracking processing unit 310, a well-known tracking technology is utilized.

Next, in the step S202, the parking-slot-information storage unit 320 outputs the signal E including the positional information of each of the parking slots. The respective positional information pieces of all the parking slots in the distribution facility are preliminarily measured by use of a high-accuracy GNSS (Global Navigation Satellite System) receiver. In the present embodiment, the positional information pieces mean the latitude, the longitude, and the parking slot ID (Identification). The parking slot ID signifies the numbers "1" through "N"; "N" is a preliminarily set parameter and indicates the number of the parking slots in the distribution facility.

Next, in the step S203, the parking completion determination unit 330 determines whether or not a trailer has completed parking in a parking slot; in the case where the trailer has completed parking, the parking completion determination unit 330 outputs the signal F including the parking completion flag, the tentative trailer number, and the absolute-coordinate-system positional information of the trailer.

At last, in the step S204, the collation unit 340 collates the signal F from the parking completion determination unit 330 with the signal B from the trailer number management PC 200, replaces the tentative trailer number of the trailer that has completed parking by the trailer number included in the signal B from the trailer number management PC 200, and then outputs the signal C including the replaced trailer number and the absolute-coordinate-system positional information of the trailer that has completed parking.

Figure 5:
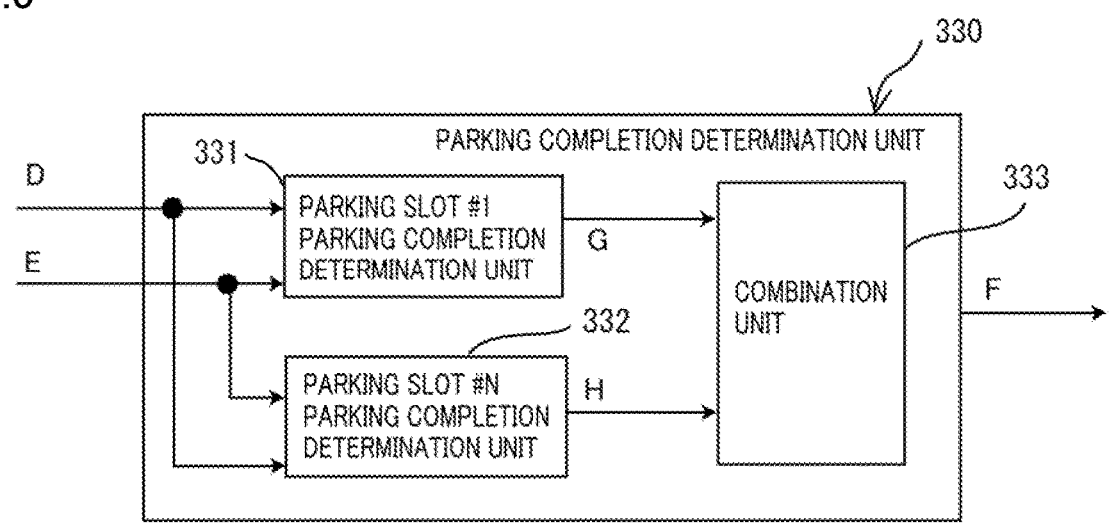
FIG. 5 is a block diagram representing the configuration of a perking completion determination unit in the vehicle tracking system according to Embodiment 1.

Next, the configuration and the operation of the parking completion determination unit 330 will be explained. FIG. 5 is a block diagram representing the configuration of the parking completion determination unit in the vehicle tracking system according to Embodiment 1. In FIG. 5, the parking completion determination unit 330 includes a parking slot #1 parking completion determination unit 331 and a parking slot #N parking completion determination unit 332, and a combination unit 333. In this situation, each of "#1" and "#N" means the number of a parking slot. In addition, each of "1" and "N" means the parking slot ID.

In addition, in the present embodiment, only the parking slot #1 parking completion determination unit 331 and the parking slot #N parking completion determination unit 332 are represented; however, corresponding to two or more parking slots #1 through #N, two or more parking slot parking completion determination units are provided. The numerals "1" through "N" are the respective parking slots ID of the parking slots #1 through #N. In the following explanation, only the parking slot #1 parking completion determination unit 331 and the parking slot #N parking completion determination unit 332 will be explained.

The parking slot #1 parking completion determination unit 331 receives the signal D including the tentative trailer number and the absolute-coordinate-system positional information of a trailer from the tracking processing unit 310 and the signal E including the respective positional information pieces of the parking slots from the parking-slot-information storage unit 320 and then determines whether or not parking in the parking slot #1 has been completed; in the case where the parking has been completed, the parking slot #1 parking completion determination unit 331 outputs a signal G including a parking completion flag "1", the tentative trailer number of the trailer that has completed the parking, and the absolute-coordinate-system positional information of the trailer that has completed the parking. In the case where the parking has not been completed, the parking completion flag indicates "0".

Similarly, the parking slot #N parking completion determination unit 332 receives the signal D including the tentative trailer number and the absolute-coordinate-system positional information of a trailer from the tracking processing unit 310 and the signal E indicating the respective positional information pieces of the parking slots from the parking-slot-information storage unit 320 and then determines whether or not parking in the parking slot #N has been completed; in the case where the parking has been completed, the parking slot #N parking completion determination unit 332 outputs a signal H including the parking completion flag "1", the tentative trailer number of the trailer that has completed the parking, and the absolute-coordinate-system positional information of the trailer that has completed the parking. In the case where the parking has not been completed, the parking completion flag indicates "0".

In addition, the operation of each of the unillustrated parking slot parking completion determination units other than the parking slot #1 parking completion determination unit 331 and the parking slot #N parking completion determination unit 332 is the same as the foregoing operation.

The combination unit 333 combines the signal G from the parking slot #1 parking completion determination unit 331 with the signal H from the parking slot #N parking completion determination unit 332 and then outputs the signal F including the parking completion flag for the parking slot in the parking slot "1" and the parking slot "N", in which parking has been completed, the tentative trailer number of the trailer that has completed the parking, and the absolute-coordinate-system positional information of the trailer that has completed the parking.

Figure 6:
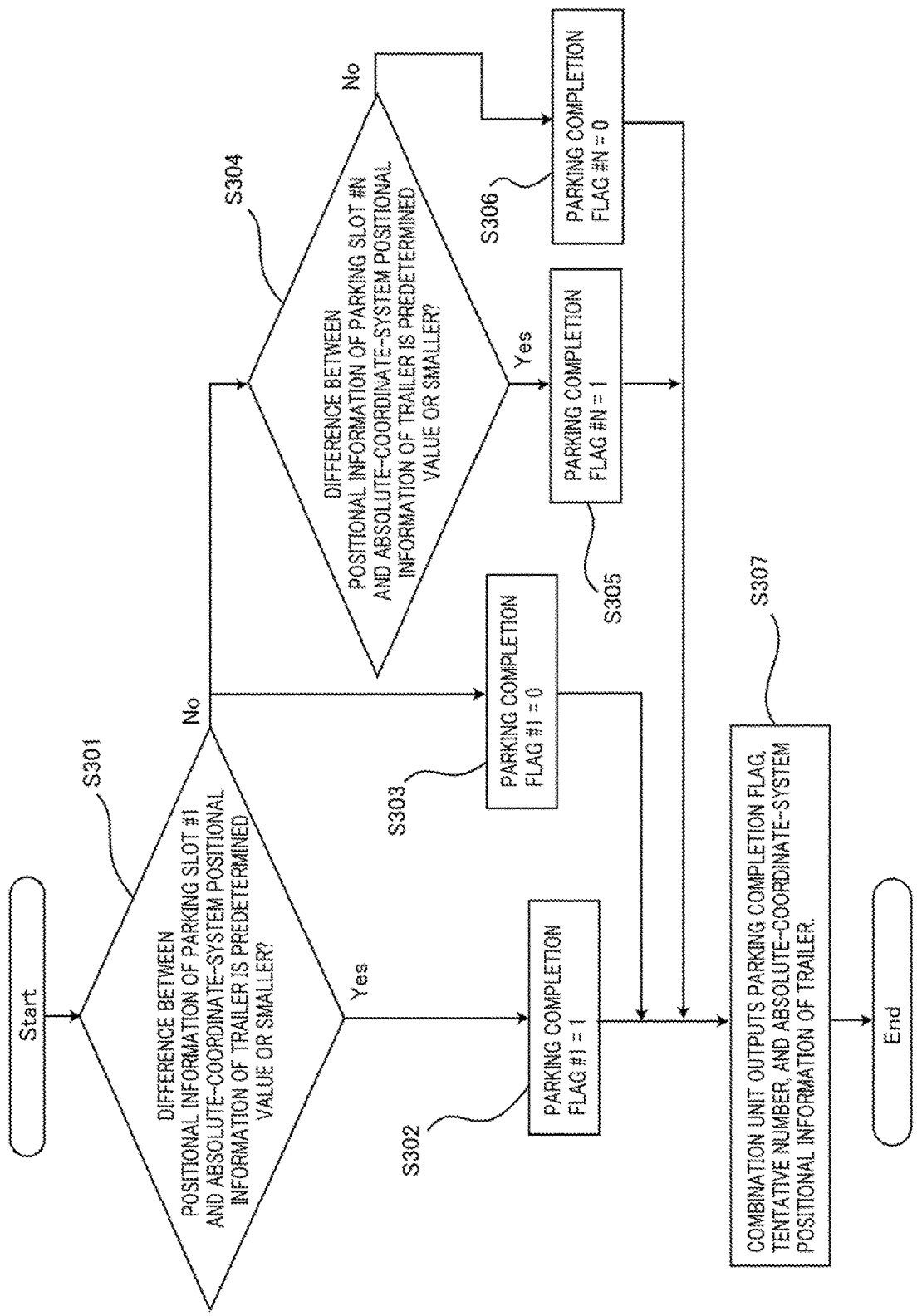
FIG. 6 is a flowchart representing the operation of the perking completion determination unit in the vehicle tracking system according to Embodiment 1.

FIG. 6 is a flowchart representing the operation of the parking completion determination unit in the vehicle tracking system according to Embodiment 1. In FIG. 6, at first, in the step S301, the parking slot #1 parking completion determination unit 331 determines whether or not the difference between the positional information of the parking slot #1 and the absolute-coordinate-system positional information of the trailer that is being tracked is smaller than a predetermined value. The predetermined value here means a preliminarily set parameter and is determined while considering the error in the sensor utilized in the trailer tracking sensor system 100.

In the case where the result of the determination in the step S301 is affirmative (Yes), the step S301 is followed by the step S302, where the parking completion flag #1 is set to "1". In this case, "1" means that the condition for parking completion in the parking slot #1 has been established.

In contrast, in the case where the result of the determination in the step S301 is negative (No), the step S301 is followed by the step S303, where the parking completion flag #0 is set to "0". In this case, "0" means that the condition for parking completion in the parking slot #1 has not been established.

Moreover, in the case where the result of the determination in the step S301 is negative (No), the step S301 is followed by the step S304, where the parking slot IfN parking completion determination unit 332 determines whether or not the difference between the positional information of the parking slot IfN and the absolute-coordinate-system positional information of the trailer that is being tracked is smaller than a predetermined value. The predetermined value here means a preliminarily set parameter and is determined while considering the error in the sensor utilized in the trailer tracking sensor system 100.

Next, in the case where the result of the determination in the step S304 is affirmative (Yes), the step S304 is followed by the step S305, where the parking completion flag #N is set to "1". In this case, "1" means that the condition for parking completion in the parking slot #N has been established.

In contrast, in the case where the result of the determination in the step S304 is negative (No), the step S304 is followed by the step S306, where the parking completion flag #N is set to "0". In this case, "0" means that the condition for parking completion in the parking slot #N has not been established.

At last, in the step S307, based on the respective flags in the steps S302 and S305, the combination unit 333 outputs a parking completion flag, the tentative trailer number of a trailer that has completed parking, and the absolute-coordinate-system positional information of the trailer.

The operation of each of the unillustrated parking slot parking completion determination units other than the parking slot #1 parking completion determination unit 331 and the parking slot #N parking completion determination unit 332 is the same as the foregoing operation. The parking completion flag is a sequence of the numerals "1" through "N".

Figure 7:
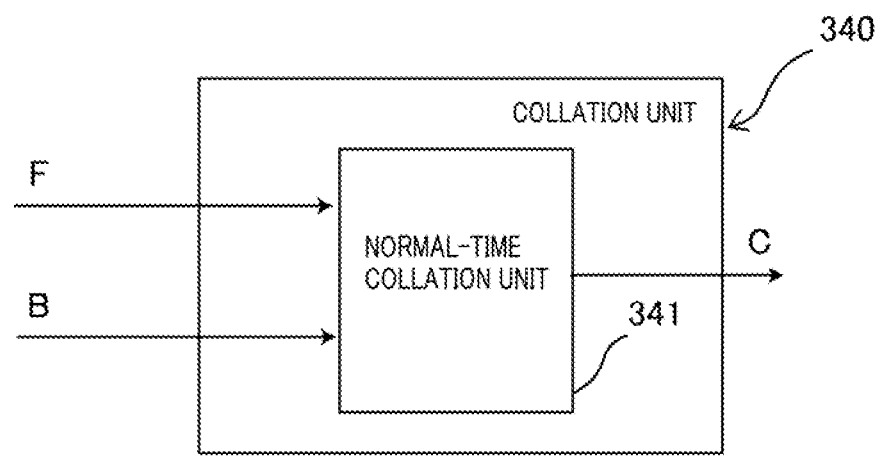
FIG. 7 is a block diagram representing the configuration of a collation unit in the vehicle tracking system according to Embodiment 1.

Next, the configuration and the operation of the collation unit 340 will be explained. FIG. 7 is a block diagram representing the configuration of the collation unit in the vehicle tracking system according to Embodiment 1. As illustrated in FIG. 7, the collation unit 340 includes a normal-time collation unit 341 that operates at a time when the vehicle tracking system 10 is normal.

Figure 8:
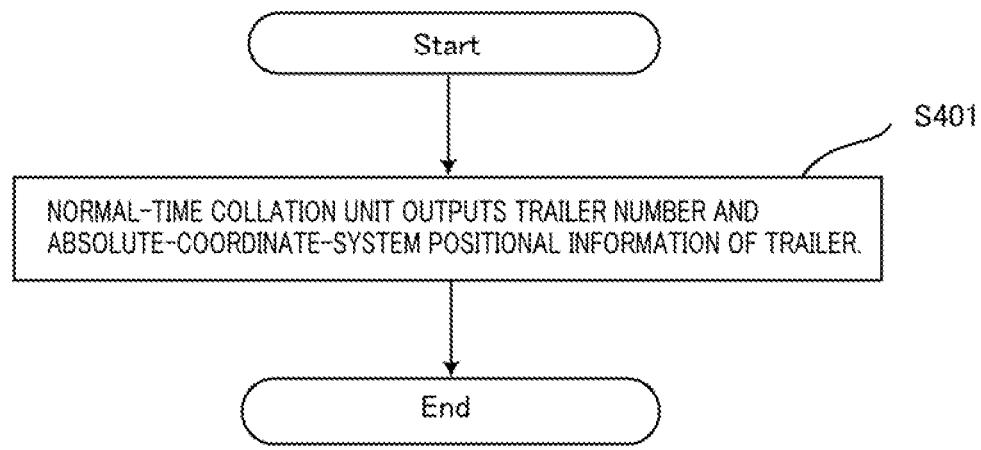
FIG. 8 is a flowchart representing the operation of the collation unit in the vehicle tracking system according to Embodiment 1.

FIG. 8 is a flowchart representing the operation of the collation unit in the vehicle tracking system according to Embodiment 1. In FIG. 8, in the step S401, at a time when the vehicle tracking system 10 is normal, the normal-time collation unit 341 collates the signal F from the parking completion determination unit 330 with the signal B from the trailer number management PC 200, and then outputs the signal C including the trailer number, included in the signal B, that has replaced the tentative trailer number of a trailer that has completed parking and the absolute-coordinate-system positional information of the trailer that has completed parking.

In the case where the signal F from the parking completion determination unit 330 includes the parking completion flag "1", the normal-time collation unit 341 replaces the tentative trailer number by the trailer number included in the signal B outputted from the trailer number management PC 200. In this case, the trailer number indicated by the signal B outputted from the trailer number management PC 200 is a trailer number that includes numerals or alphabets printed on the housing of a trailer and is inputted to the trailer number management PC 200 by a receptionist.

In contrast, in the case where the parking completion flag is "0", the normal-time collation unit 341 does not replace the tentative trailer number. In other words, the tentative trailer number that has preliminarily been provided becomes an ineffective value.

As described above, the vehicle tracking system 10 according to Embodiment 1 includes the trailer tracking sensor system 100 provided in the distribution facility, the trailer number management PC 200, and the edge computing 300; at a time when the system is normal and parking is completed, the tentative trailer number, which is the output of the trailer tracking sensor system 100, is replaced by a trailer number recorded at the entrance reception of the distribution facility, so that it is made possible to constantly identify the trailer, without adding or modifying hardware items of the trailer and the tractor.

Embodiment 2

Figure 9:
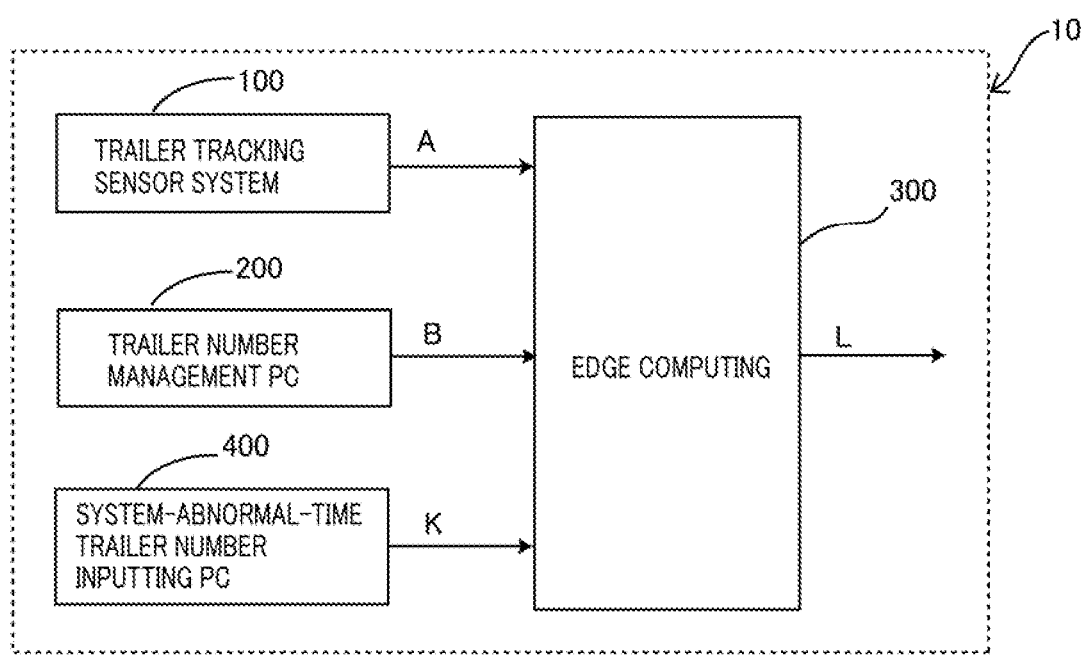
FIG. 9 is a block diagram representing the overall configuration of a vehicle tracking system according to Embodiment 2.

Next, a vehicle tracking system according to Embodiment 2 will be explained. The vehicle tracking system according to Embodiment 2 has a configuration in which a time when the sensor or the system is abnormal is considered. FIG. 9 is a block diagram representing the overall configuration of a vehicle tracking system according to Embodiment 2.

In FIG. 9, the vehicle tracking system 10 includes the trailer tracking sensor system 100 as a vehicle tracking sensor system, the trailer number management PC 200 as a vehicle number management PC provided at the entrance of distribution facility, the edge computing 300, and a system-abnormal-time trailer number inputting PC 400 as a system-abnormal-time vehicle number inputting PC. The trailer tracking sensor system 100 detects one or more trailers, as vehicles, existing in the distribution facility as a predetermined area.

As is the case with foregoing Embodiment 1, the edge computing 300 is configured with a controller unit including a CPU (Central Processing Unit) and performs communication with the trailer tracking sensor system 100, with the trailer number management PC 200, and with the system-abnormal-time trailer number inputting PC 400. The communication in the present embodiment means LTE or 5G; a constant communication speed is secured.

In order to detect all traveling roads in the distribution facility, the trailer tracking sensor system 100 is provided with two or more sensor poles. The respective setting positions of the sensor poles are preliminarily measured by use of a high-accuracy GNSS receiver. In the present embodiment, the setting position of the sensor pole is determined based on the latitude, the longitude, the altitude, and the azimuth.

In order to detect trailers traveling in the distribution facility, the trailer tracking sensor system 100 includes a LiDAR, a camera, and a millimeter wave radar. The camera is utilized for distinguishing a trailer from other obstacles such as a human, a passenger car, and an animal. In addition, an infra-red camera may be utilized in accordance with the external environment around the distribution facility.

The trailer tracking sensor system 100 outputs a signal A including a tentative trailer number, as a tentative vehicle number for a detected trailer, absolute-coordinate-system positional information of the detected trailer, and counter information of a sensor. Each of all the sensors provided in the trailer tracking sensor system 100 outputs a count value of a sensor counter. The sensor counter counts up by 1 every calculation period; when reaching a preliminarily set memory number, the count value returns to "0".

The trailer number management PC 200 is installed at the entrance reception of the distribution facility. A receptionist inputs numerals or alphabets printed on the housing of a trailer entering from the outside of the distribution facility into the inside of the distribution facility, as the trailer number information, to the trailer number management PC 200. The trailer number management PC 200 outputs a signal B including an inputted trailer number.

The system-abnormal-time trailer number inputting PC 400, as a system-abnormal-time vehicle number inputting PC, is managed by an operator. When at least part of the vehicle tracking system 10 has a system abnormality (Hereinafter, referred to only as a system abnormality), the operator moves to a parking slot where a non-managed trailer is parked and then inputs numerals or alphabets printed on the trailer to the system-abnormal-time trailer number inputting PC 400.

In addition, the operator measures the absolute-coordinate-system positional information of the non-managed trailer by use of a GNSS receiver and then inputs also the result of the measurement to the system-abnormal-time trailer number inputting PC 400. In this situation, the absolute-coordinate-system positional information means the latitude, the longitude, the altitude, and the azimuth.

The system-abnormal-time trailer number inputting PC 400 outputs a signal K including the inputted trailer number of the trailer and the absolute-coordinate-system positional information of the trailer.

The edge computing 300 is configured with a PC provided in a remote monitoring room or the like, receives the signal A from the trailer tracking sensor system 100, the signal B from the trailer number management PC 200, and the signal K from the system-abnormal-time trailer number inputting PC 400, and then outputs an after-mentioned signal L, based on these inputted signals A, B, and K.

When the vehicle tracking system 10 is normal, the signal L to be outputted from the edge computing 300 becomes a signal based on the signal A from the trailer tracking sensor system 100 and the signal B from the trailer number management PC 200 and includes the trailer number of a trailer that has completed parking and the absolute-coordinate-system positional information of the trailer that has completed parking; thus, the signal L is a signal corresponding to the signal C to be outputted from the vehicle tracking system according to foregoing Embodiment 1.

In contrast, when the system is abnormal, the signal L to be outputted from the edge computing 300 becomes a signal based on the signal K from the system-abnormal-time trailer number inputting PC 400 and includes the trailer number of a non-managed trailer at a time when the system is abnormal and the absolute-coordinate-system positional information of the trailer.

Figure 10:
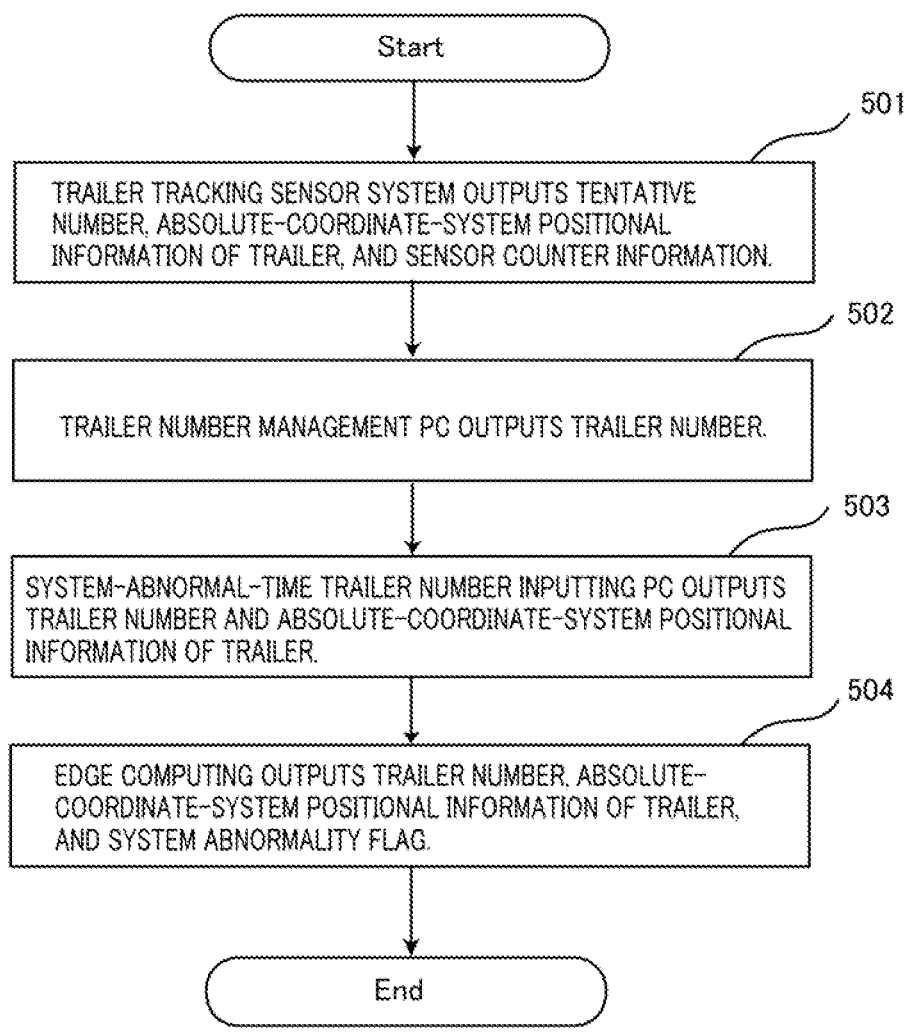
FIG. 10 is a flowchart representing the operation of the vehicle tracking system according to Embodiment 2.

FIG. 10 is a flowchart representing the operation of the vehicle tracking system according to Embodiment 2. In FIG. 10, at first, in the step S501, the trailer tracking sensor system 100 outputs the signal A including the tentative trailer number of a detected trailer, the absolute-coordinate-system positional information of the detected trailer, and the counter information of the sensor counter.

Only when detecting a trailer, the trailer tracking sensor system 100 outputs the tentative trailer number and the absolute-coordinate-system positional information of the trailer. In contrast, when detecting an obstacle other than a trailer, the trailer tracking sensor system 100 makes the tentative trailer number and the absolute-coordinate-system positional information of the detected trailer become ineffective values. In this situation, the absolute-coordinate-system positional information of the detected trailer means the latitude, the longitude, the altitude, and the azimuth.

Moreover, the trailer tracking sensor system 100 provides a tentative trailer number to each of detected trailers. The tentative trailer number to be provided is not particularly restricted; for example, the tentative trailer number is formed of a numeral that is counted up by 1 from "1".

Next, in the step S502, the trailer number management PC 200 outputs the signal B including a trailer number that has been inputted therein.

In the case where no system abnormality exists and hence the system is normal, the edge computing 300 outputs the signal C including the trailer number of a trailer that has completed parking and the absolute-coordinate-system positional information of the trailer, as represented in the step S103 in FIG. 2, related to the vehicle tracking system according to Embodiment 1; however, in FIG. 10, the step corresponding to the step S103 in FIG. 2 is omitted.

In the case where it is determined that a system abnormality has occurred in the vehicle tracking system 10, the system-abnormal-time trailer number inputting PC 400 outputs, in the step S503, the signal K including the trailer number of a non-managed trailer, inputted at a time when the system is abnormal, and the absolute-coordinate-system positional information of the trailer.

At last, in the step S504, at a time when the system is abnormal, the edge computing 300 outputs the trailer number of a non-managed trailer, the absolute-coordinate-system positional information of the trailer, and a system abnormality flag, based on the signal K from the system-abnormal-time trailer number inputting PC 400.

Figure 11:
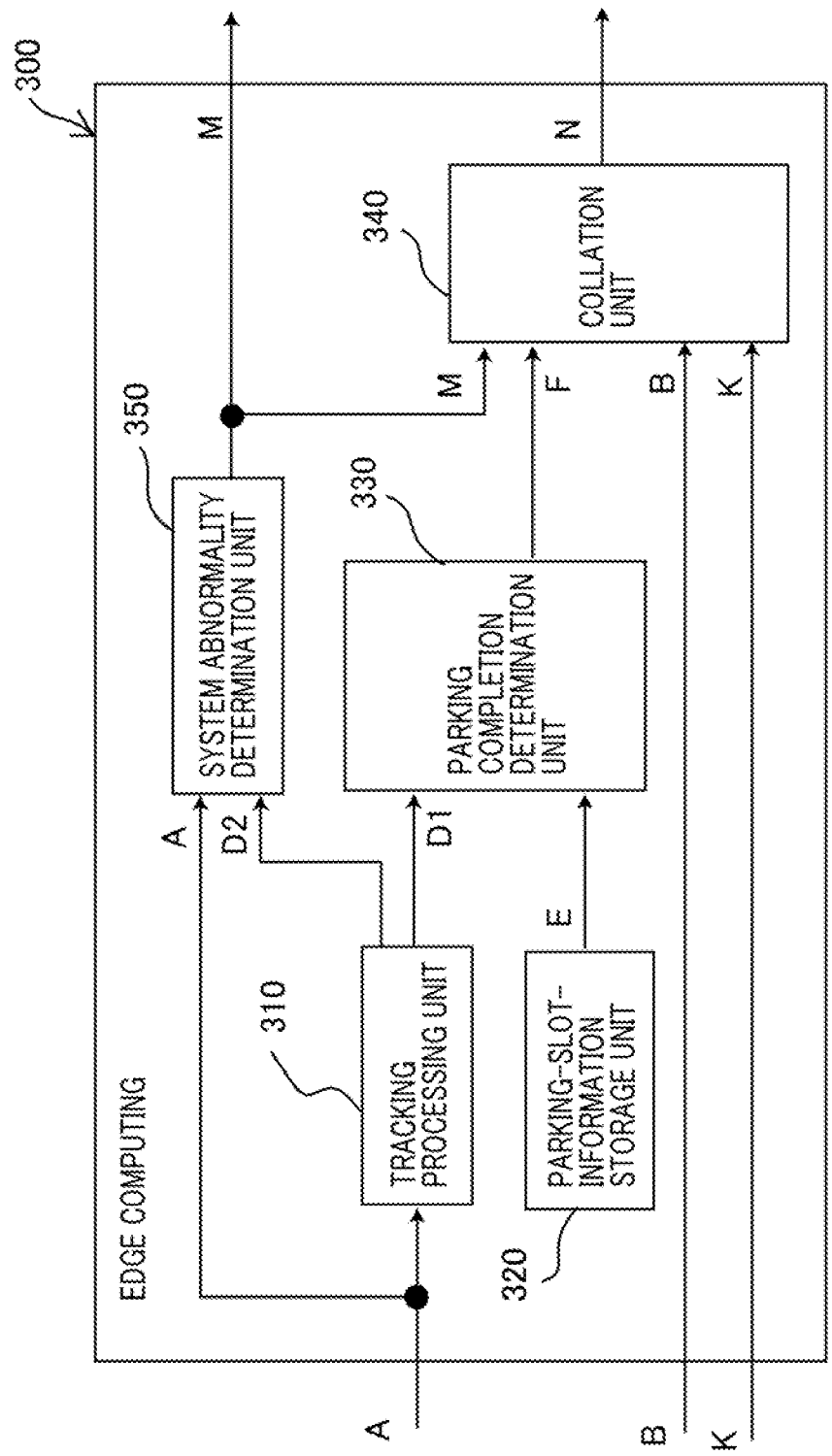
FIG. 11 is a block diagram representing the configuration of edge computing in the vehicle tracking system according to Embodiment 2.

Next, the configuration and the operation of the edge computing 300 according to Embodiment 2 will be explained. FIG. 11 is a block diagram representing the configuration of the edge computing in the vehicle tracking system according to Embodiment 2. In FIG. 11, the edge computing 300 includes the tracking processing unit 310, the parking-slot-information storage unit 320, the parking completion determination unit 330, the collation unit 340, and a system abnormality determination unit 350.

The tracking processing unit 310 receives the signal A from the trailer tracking sensor system 100. In this situation, the signal A is a signal including the tentative trailer number for a detected trailer, the absolute-coordinate-system positional information of the trailer, and the counter information of the sensor in the trailer tracking sensor system 100.

Based on the inputted signal A, the tracking processing unit 310 tracks the detected trailer and then outputs a signal D1 including the tentative trailer number of the trailer that is being tracked and the absolute-coordinate-system positional information of the trailer. In addition, the tracking processing unit 310 outputs a signal D2 including the tracking flag.

The parking-slot-information storage unit 320 outputs the signal E including the positional information of each of parking slots. The parking completion determination unit 330 receives the signal D1 from the tracking processing unit 310 and the signal E from the parking-slot-information storage unit 320 and then determines whether or not a trailer has completed parking in a parking slot; in the case where the parking has been completed, the parking completion determination unit 330 outputs the signal F including the parking completion flag, the tentative trailer number of the trailer that has completed the parking, and the absolute-coordinate-system positional information of the trailer that has completed the parking.

The system abnormality determination unit 350 receives the signal A from the trailer tracking sensor system 100 and the signal D2 from the tracking processing unit 310 and then determines, as described later, whether or not a system abnormality exists in the vehicle tracking system 10; in the case where it is determined that a system abnormality exists in the vehicle tracking system 10, the system abnormality determination unit 350 outputs a signal M including the system abnormality flag. The details of the system abnormality determination unit 350 will be described later.

The collation unit 340 receives the signal M including the system abnormality flag from the system abnormality determination unit 350, the signal F from the parking completion determination unit 330, the signal B including the trailer number from the trailer number management PC 200, and the signal K from the system-abnormal-time trailer number inputting PC 400. In this situation, as described above, the signal K is a signal including the trailer number of a non-managed trailer and the absolute-coordinate-system positional information of the trailer.

Based on the signal M, the signal F, the signal B, and the signal K, the collation unit 340 performs an after-mentioned collation and then outputs a signal N including the trailer number, and the absolute-coordinate-system positional information of the trailer. The details of the collation unit 340 will be described later.

Figure 12:
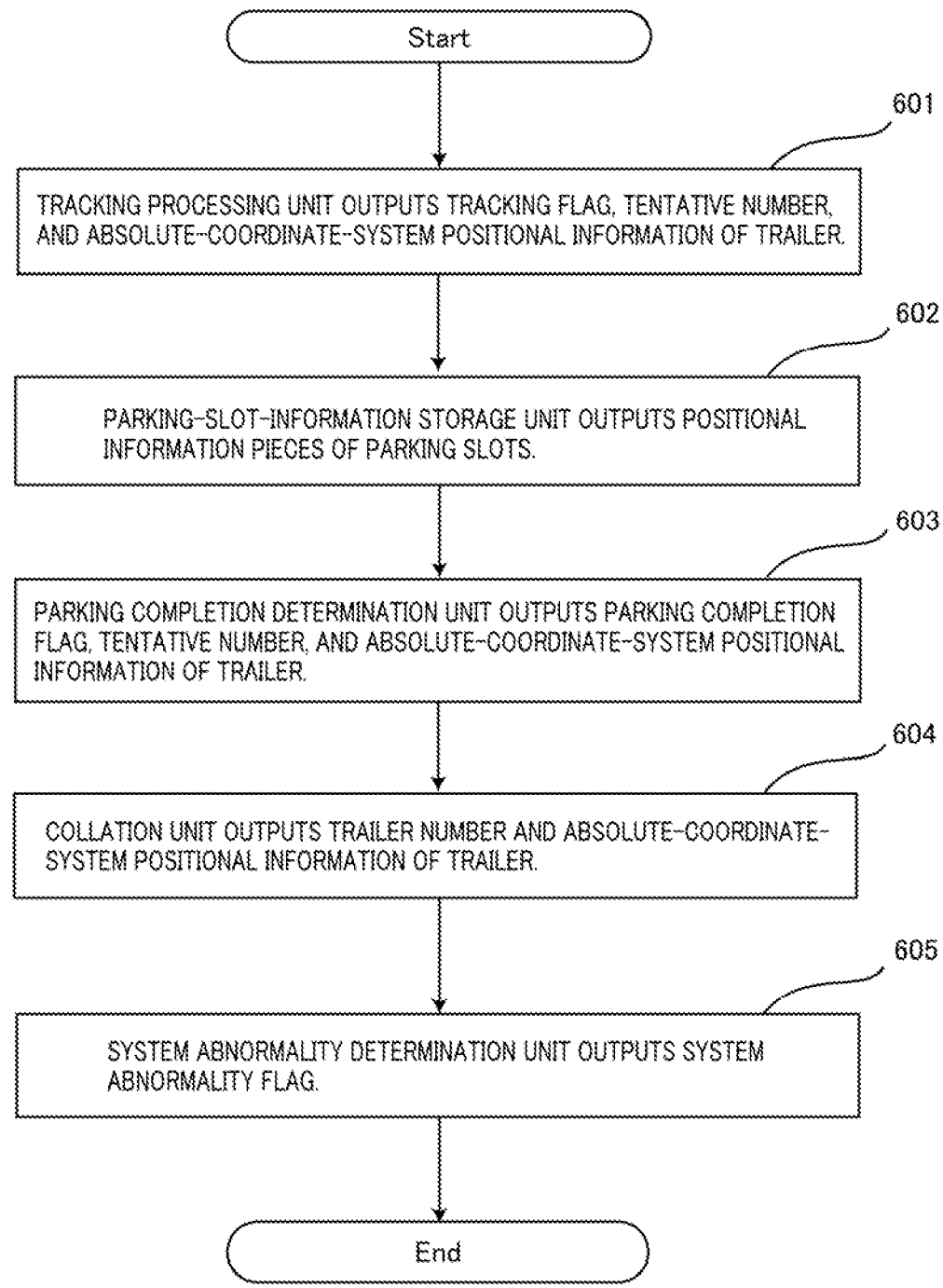
FIG. 12 is a flowchart representing the operation of the edge computing in the vehicle tracking system according to Embodiment 2.

FIG. 12 is a flowchart representing the operation of the edge computing in the vehicle tracking system according to Embodiment 2. In FIG. 12, at first, in the step S601, based on the signal A inputted from the trailer tracking sensor system 100, the tracking processing unit 310 tracks a detected trailer and outputs the signals D1 and D2.

In the present embodiment, the signal D1 to be outputted from the tracking processing unit 310 is a signal including the tentative trailer number of a trailer detected by the trailer tracking sensor system 100, the absolute-coordinate-system positional information of the trailer, and the signal D2 is a signal including a tracking flag. In this situation, the tracking processing utilizes a well-known tracking technology.

Next, in the step S602, the parking-slot-information storage unit 320 outputs the signal E including the positional information of each of the parking slots. The respective positional information pieces of all the parking slots in the distribution facility are preliminarily measured by use of a high-accuracy GNSS receiver. In the present embodiment, the positional information pieces mean the latitude, the longitude, and the parking slot ID. The parking slot ID signifies the numbers "1" through "N"; "N" is a preliminarily set parameter and indicates the number of the parking slots in the distribution facility.

Next, in the step S603, the parking completion determination unit 330 determines whether or not a trailer has completed parking in a parking slot; in the case where the trailer has completed parking, the parking completion determination unit 330 outputs the signal F including the parking completion flag, the tentative trailer number, and the absolute-coordinate-system positional information of the trailer.

Next, in the step S604, based on the signal M, the signal F, the signal B, and the signal K, the collation unit 340 performs an after-mentioned collation and then outputs the signal N including the trailer number, and the absolute-coordinate-system positional information of the trailer.

At last, in the step S605, the system abnormality determination unit 350 outputs the signal M including the system abnormality flag.

Figure 13:
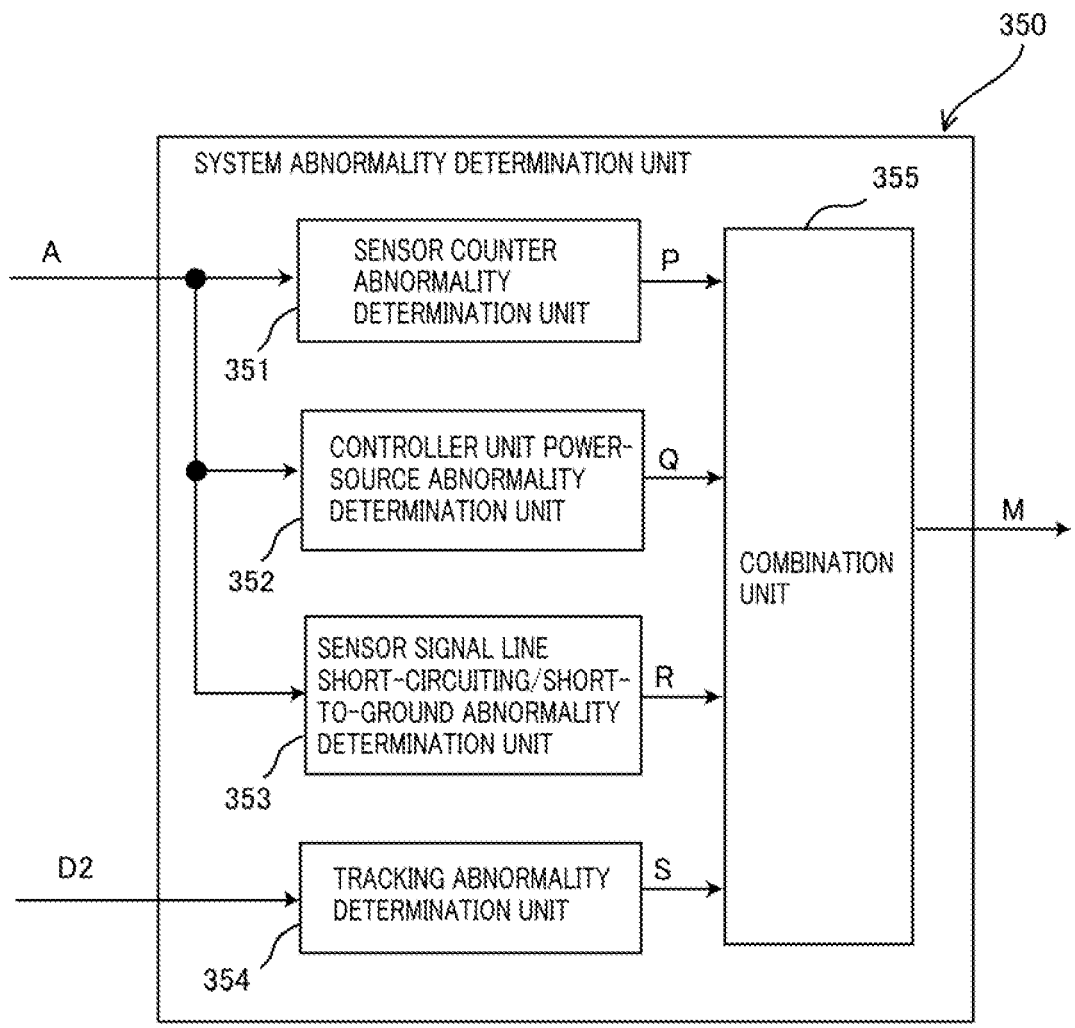
FIG. 13 is a block diagram representing the configuration of a system abnormality determination unit in the vehicle tracking system according to Embodiment 2.

Next, the configuration and the operation of the system abnormality determination unit 350 according to Embodiment 2 will be explained. FIG. 13 is a block diagram representing the configuration of the system abnormality determination unit in the vehicle tracking system according to Embodiment 2. In FIG. 13, the system abnormality determination unit 350 includes a sensor counter abnormality determination unit 351, a controller unit power-source abnormality determination unit 352, a sensor signal line short-circuiting/short-to-ground abnormality determination unit 353, a tracking abnormality determination unit 354, and a combination unit 355.

The sensor counter abnormality determination unit 351 receives the signal A from the trailer tracking sensor system 100 and determines whether or not any abnormality exists in the sensor counter, based on the sensor counter information included in the signal A. Each of all the sensors provided in the trailer tracking sensor system 100 outputs a count value of the sensor counter. The sensor counter counts up by 1 every calculation period; when reaching a preliminarily set memory number, the count value returns to "0".

Accordingly, when the count value of the sensor counter continues to be updated, the sensor counter is normal and hence a sensor abnormality flag is "0". In contrast, when the update of the count value of the sensor counter stops for a predetermined time, the sensor counter is abnormal and hence the sensor abnormality flag is "1". Based on the foregoing determination, the sensor counter abnormality determination unit 351 outputs a signal P including a sensor counter abnormality flag.

The controller unit power-source abnormality determination unit 352 determines the state of a voltage applied to the controller unit included in the edge computing 300 and then outputs a signal Q including a controller unit power-source abnormality flag. In the case where the voltage applied to the controller unit is smaller or larger than the specified value, the controller unit power-source abnormality flag is "1". In contrast, in the case where the voltage applied to the controller unit is within the specification, the controller unit power-source abnormality flag is "0".

The sensor signal line short-circuiting/short-to-ground abnormality determination unit 353 determines whether or not a short-circuiting abnormality or a short-to-ground abnormality exists in any of the respective signal lines of all the sensors mounted in the trailer tracking sensor system 100 and then outputs a signal R including a power-source-line abnormality flag. In the case where any one of the signal lines has a short-circuiting fault or a short-to-ground fault, the power-source-line abnormality flag is "1". In contrast, in the case where none of all the signal lines has a short-circuiting fault or a short-to-ground fault, i.e., in the case of a normal time, the power-source-line abnormality flag is "0".

The tracking abnormality determination unit 354 determines whether or not the tracking processing unit 310 is continuing tracking of a trailer and then outputs a signal S including a tracking abnormality flag. In the case where the tracking processing unit 310 continues tracking of a trailer, the tracking abnormality flag is "0". In contrast, in the case where there occurs a state in which tracking of a trailer cannot be performed, the tracking abnormality flag is "1".

The combination unit 355 receives the signal P from the sensor counter abnormality determination unit 351, the signal Q from the controller unit power-source abnormality determination unit 352, the signal R from the sensor signal line short-circuiting/short-to-ground abnormality determination unit 353, and the signal S from the tracking abnormality determination unit 354 and then outputs the signal M including the system abnormality flag, based on the signals P, Q, R, and S.

Figure 14:
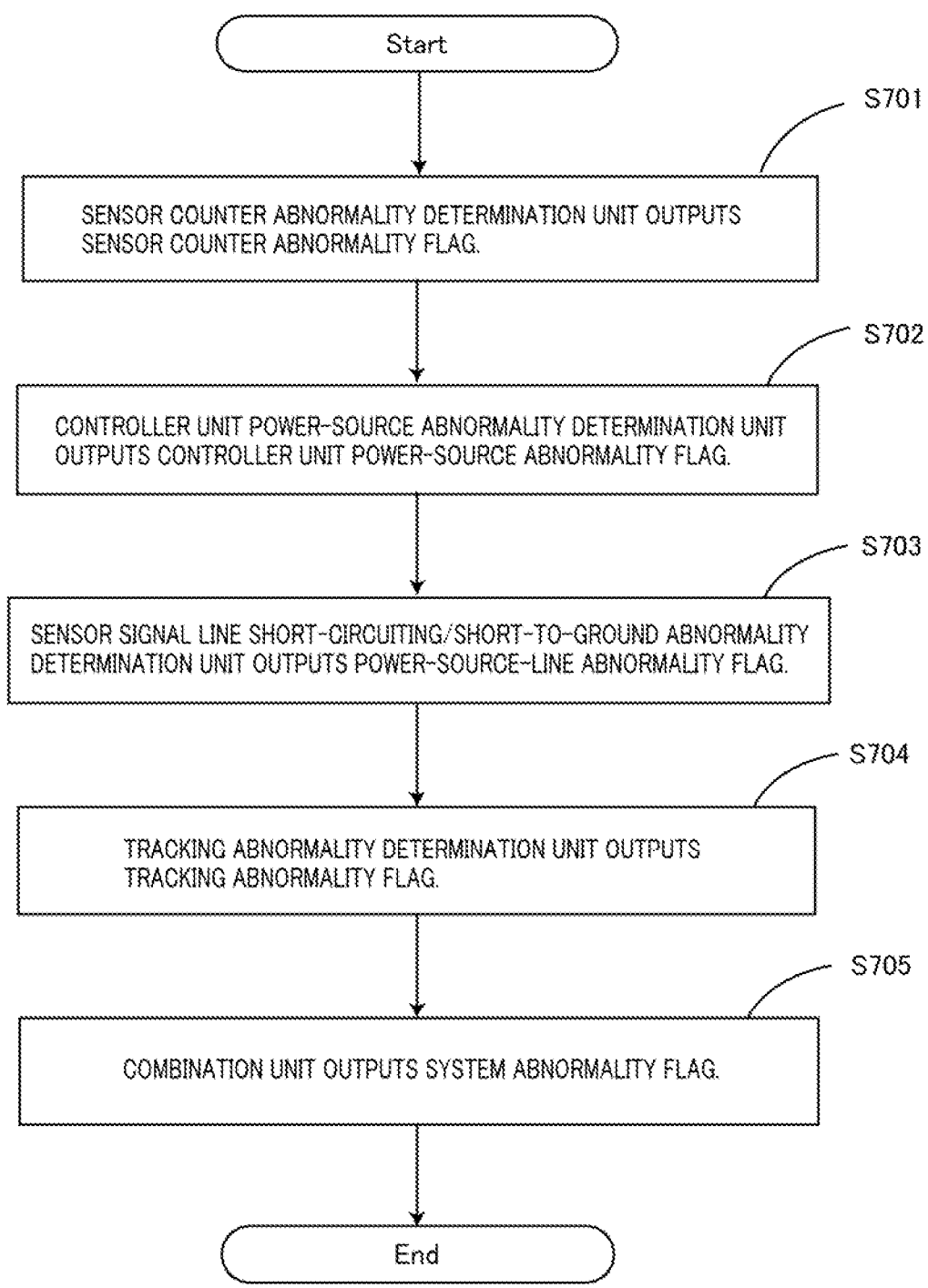
FIG. 14 is a flowchart representing the operation of the system abnormality determination unit in the vehicle tracking system according to Embodiment 2.

FIG. 14 is a flowchart representing the operation of the system abnormality determination unit in the vehicle tracking system according to Embodiment 2. In FIG. 14, at first, in the step S701, the sensor counter abnormality determination unit 351 determines whether or not an abnormality exists in the sensor counter and then outputs the signal P including the sensor abnormality flag that is "0" when the count value of the sensor counter continues to be updated and that is "1" when the update of the count value of the sensor counter continues for a predetermined time and then stops.

Next, in the step S702, the controller unit power-source abnormality determination unit 352 determines the state of a voltage applied to the controller unit included in the edge computing 300 and then outputs the signal Q including the controller unit power-source abnormality flag that is "1" when the voltage applied to the controller unit is smaller or larger than the specified value and that is "0" when the voltage applied to the controller unit is within the specification.

Next, in the step S703, the sensor signal line short-circuiting/short-to-ground abnormality determination unit 353 determines whether or not a short-circuiting abnormality or a short-to-ground abnormality exists in any of the respective signal lines of all the sensors mounted in the trailer tracking sensor system 100 and then outputs the signal R including the power-source-line abnormality flag that is "1" when any one of the signal lines has a short-circuiting fault or a short-to-ground fault and that is "0" when all the signal lines are normal.

Next, in the step S704, the tracking abnormality determination unit 354 determines whether or not the tracking processing unit 310 is continuing tracking of a trailer and then outputs the signal S including the tracking abnormality flag that is "0" when the tracking processing unit 310 continues tracking of a trailer and that is "1" when there occurs a state in which tracking of a trailer cannot be performed.

At last, the combination unit 355 combines the signals P, Q, R, and S and then outputs the signal M including the system abnormality flag that is "0" when all these signals P, Q, R, and S are respective flags of "0" indicating normality and that is "1" when at least one of the signals P, Q, R, and S is a flag of "1".

Figure 15:
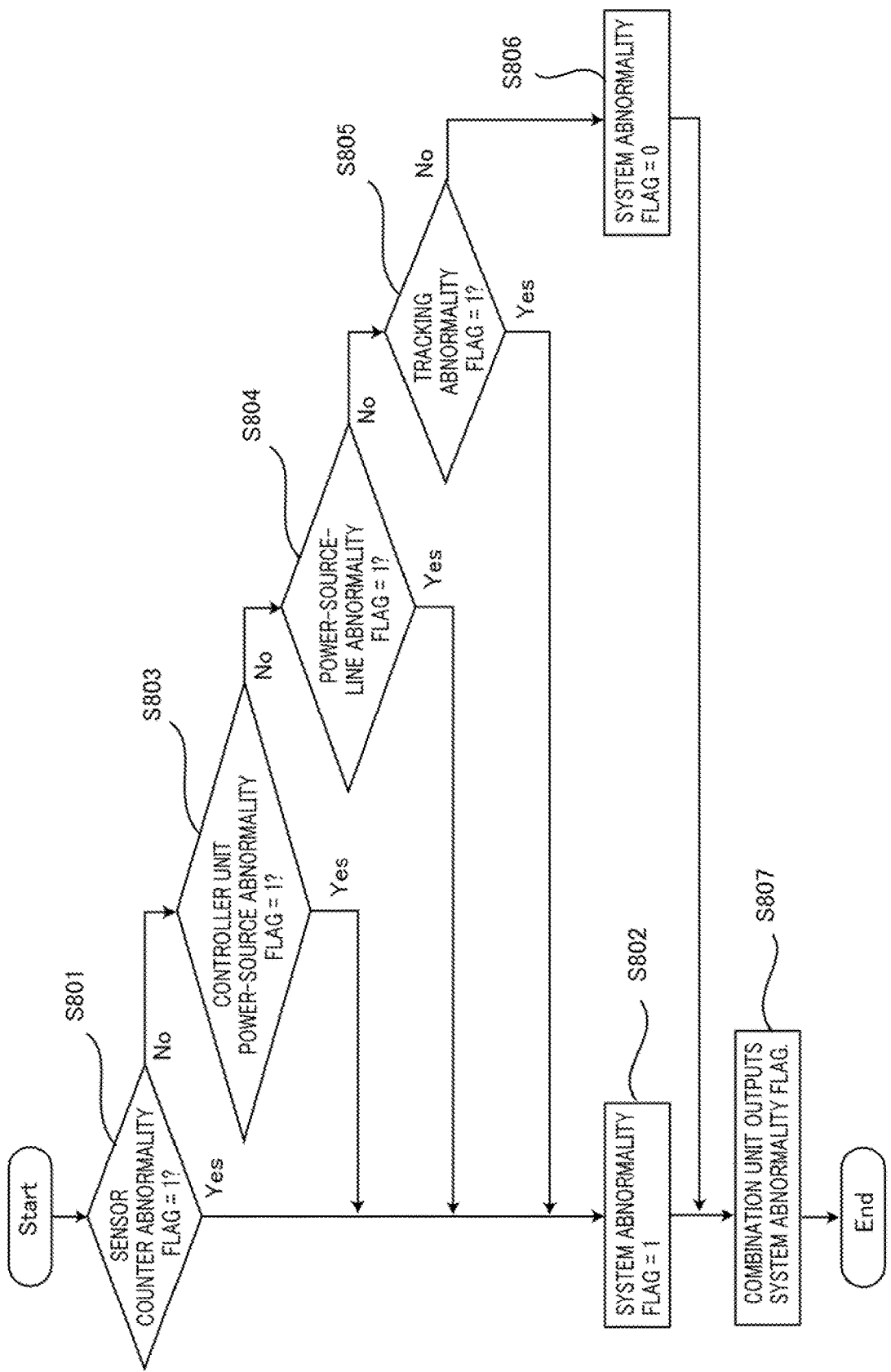
FIG. 15 is a flowchart representing the operation of a combination unit of the system abnormality determination unit in the vehicle tracking system according to Embodiment 2.

FIG. 15 is a flowchart representing the operation of the combination unit of the system abnormality determination unit in the vehicle tracking system according to Embodiment 2. In FIG. 15, at first, in the step S801, the combination unit 355 determines whether or not the sensor counter abnormality flag is "1". In the case where the result of the determination in the step S801 is affirmative (Yes), the step S801 is followed by the step S802; in the case where the result of the determination in the step S801 is negative (No), the step S801 is followed by the step S803.

In the step S803, the combination unit 355 determines whether or not a controller unit abnormality flag is "1"; in the case where the result of the determination is affirmative (Yes), the step S803 is followed by the step S802; in the case where the result of the determination is negative (No), the step S803 is followed by the step S804. In the step S804, the combination unit 355 determines whether or not the power-source-line abnormality flag is "1"; in the case where the result of the determination is affirmative (Yes), the step S804 is followed by the step S802; in the case where the result of the determination is negative (No), the step S804 is followed by the step S805.

In the step S805, the combination unit 355 determines whether or not the tracking abnormality flag is "1"; in the case where the result of the determination is affirmative (Yes), the step S805 is followed by the step S802; in the case where the result of the determination is negative (No), the step S805 is followed by the step S806.

In the case where in any of the steps S803, S804, and S805, the result of the determination is affirmative (Yes) and the particular step is followed by the step S802, the combination unit 355 outputs the signal M including the system abnormality flag of "1".

In contrast, in the case where the result of the determination in the step S805 is negative (No), the step S805 is followed by the step S806, where the system abnormality flag is set to "0"; then, the step S806 is followed by the step S807, where the combination unit 355 outputs the signal M including the system abnormality flag of "0".

Figure 16:
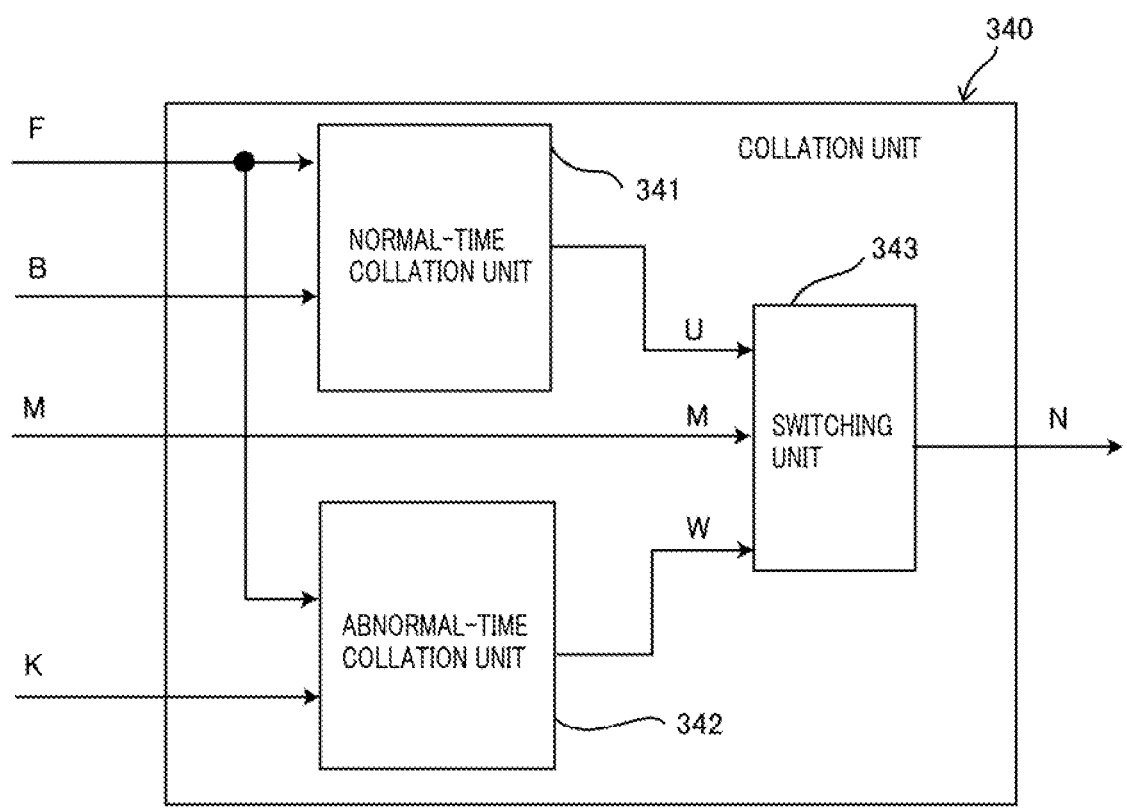
FIG. 16 is a block diagram representing the configuration of a collation unit in the vehicle tracking system according to Embodiment 2.

Next, the configuration and the operation of the collation unit 340 in the edge computing 300 will be explained. FIG. 16 is a block diagram representing the configuration of the collation unit in the vehicle tracking system according to Embodiment 2. In FIG. 16, the collation unit 340 has the normal-time collation unit 341, an abnormal-time collation unit 342, and a switching unit 343.

The normal-time collation unit 341 receives the signal F from the parking completion determination unit 330 and the signal B from the trailer number management PC 200, collates information included in the signal F with information included in the signal B, and then outputs a signal U including the trailer number of a trailer that has completed parking and the absolute-coordinate-system positional information of the trailer. In this situation, the signal F is a signal including the parking completion flag, the trailer number of a trailer that has completed parking, and the absolute-coordinate-system positional information of the trailer that has completed parking, and the signal B is a signal including the trailer number inputted to the trailer number management PC 200.

The abnormal-time collation unit 342 receives the signal F from the parking completion determination unit 330 and the signal K from the system-abnormal-time trailer number inputting PC 400, collates information included in the signal F with information included in the signal K, and then outputs a signal W including the trailer number and the absolute-coordinate-system positional information. In this situation, as described above, the signal K is a signal including the trailer number of a non-managed trailer and the absolute-coordinate-system positional information of the trailer.

In accordance with the contents of the signal M that is inputted from the system abnormality determination unit 350 and includes the system abnormality flag, the switching unit 343 performs switching through which one of the output U of the normal-time collation unit 341 and the output W of the abnormal-time collation unit 342 is made to become the output N of the switching unit 343.

Figure 17:
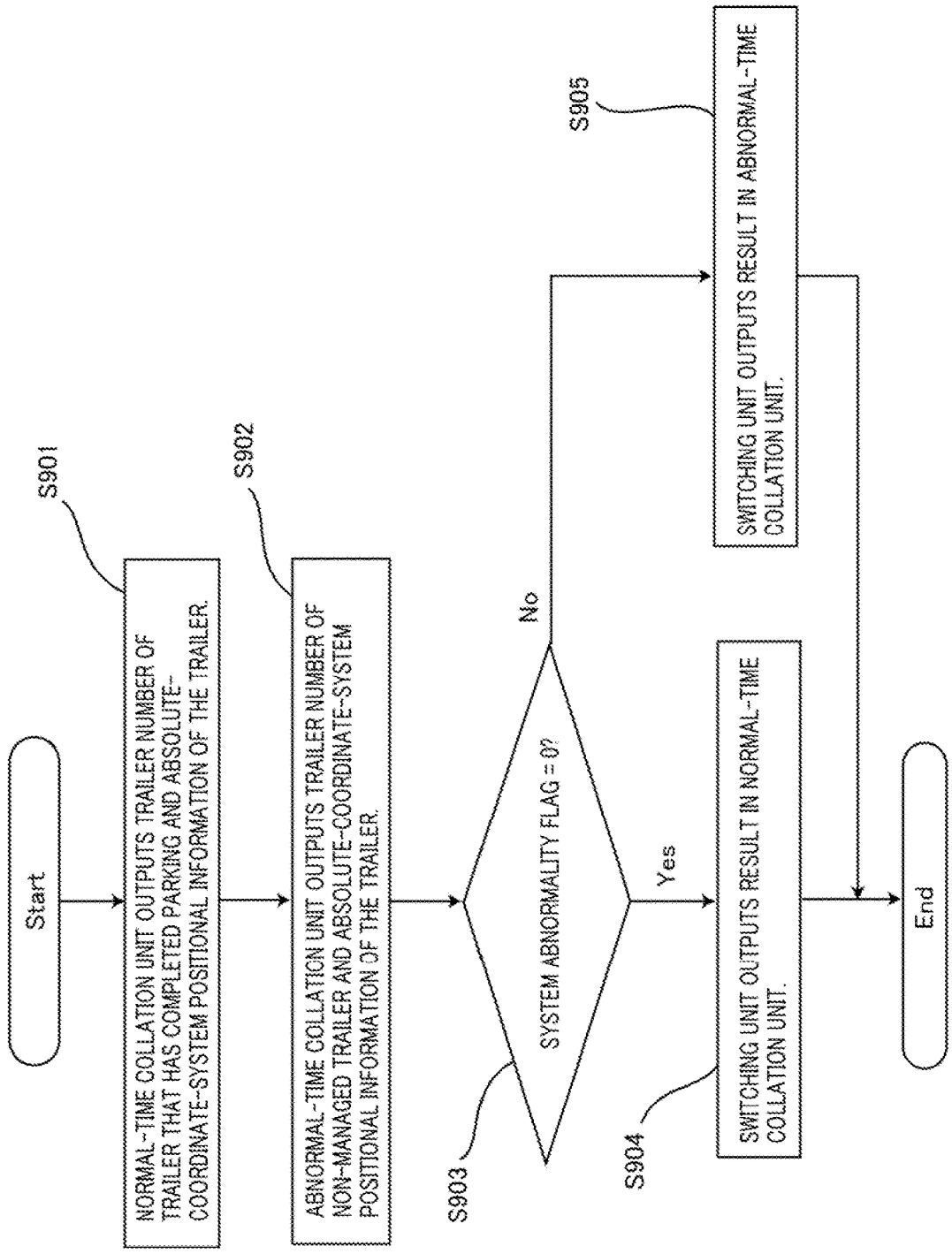
FIG. 17 is a flowchart representing the operation of the collation unit in the vehicle tracking system according to Embodiment 2.

FIG. 17 is a flowchart representing the operation of the collation unit in the vehicle tracking system according to Embodiment 2. In FIG. 17, at first, in the step S901, the normal-time collation unit 341 collates information included in the signal F from the parking completion determination unit 330 with information included in the signal B from the trailer number management PC 200 and then outputs the signal U including the trailer number of a trailer that has completed the parking and the absolute-coordinate-system positional information of the trailer that has completed the parking.

Next, in the step S902, the abnormal-time collation unit 342 collates information included in the signal F from the parking completion determination unit 330 with information included in the signal K from the system-abnormal-time trailer number inputting PC 400 and then outputs the signal W including the trailer number of a non-managed trailer and the absolute-coordinate-system positional information of the non-managed trailer.

Next, in the step S903, the switching unit 343 determines whether or not the system abnormality flag included in the signal M inputted from the system abnormality determination unit 350 is in the case where it is determined that the signal M indicating the system abnormality flag is "0" (Yes), the step S903 is followed by the step S904.

In the step S904, the switching unit 343 adopts the contents of the signal U outputted from the normal-time collation unit 341, as the contents of the signal N to be outputted from the switching unit 343. Accordingly, when the system is normal, the signal N from the switching unit 343 becomes a signal including the trailer number, obtained by replacing the tentative trailer number of a trailer that has completed parking by the trailer number from the trailer number management PC, and the absolute-coordinate-system positional information of the trailer that has completed the parking.

In contrast, in the case where it is determined in the step S903 that the signal M indicating the system abnormality flag is "1" (No), the step S903 is followed by the step S905, where the switching unit 343 adopts the contents of the signal W outputted from the abnormal-time collation unit 342, as the contents of the signal N to be outputted from the switching unit 343. Accordingly, when the system is abnormal, the signal N from the switching unit 343 becomes a signal including the trailer number of a non-managed trailer parked in a parking slot and the absolute-coordinate-system positional information of the non-managed trailer.

As described above, the vehicle tracking system 10 according to Embodiment 2 includes the trailer tracking sensor system 100 provided in the distribution facility, the trailer number management PC 200, the edge computing 300, and the system-abnormal-time trailer number inputting PC 400; moreover, the system abnormality determination unit 350 is provided in the edge computing 300; thus, when the system is normal and parking has been completed, the tentative vehicle number, which is the output of the trailer tracking sensor system, can be replaced by the output of the trailer number management PC in which the trailer number is recorded at the entrance reception of the distribution facility.

In contrast, when the system is abnormal, the operator moves to the parking slot where a non-managed trailer is parked and then inputs the numerals or alphabets printed on the trailer housing to the system-abnormal-time trailer number inputting PC 400. In addition, the operator measures the absolute-coordinate-system positional information of the foregoing trailer by use of a GNSS receiver and then inputs also the result of the measurement to the system-abnormal-time trailer number inputting PC 400.

Then, the tentative trailer number, which is the output of the trailer tracking sensor system 100, is replaced by the trailer number, which is the output of the system-abnormal-time trailer number inputting PC 400, so that at a time when the system is abnormal, it is made possible to constantly identify a trailer, without adding or modifying hardware items of the trailer and the tractor.

Although the present disclosure describes two exemplary embodiments, it should be understood that the various features, aspects, and functions described in these embodiments are not limited in their applicability to the particular embodiment, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

Next, the respective features of the vehicle tracking systems disclosed in the present disclosure will be described as appendixes.

(Appendix 1) A vehicle tracking system for tracking a vehicle existing in a predetermined area, comprising:
a vehicle tracking sensor system that has a sensor for detecting the vehicle, provides a tentative vehicle number to the vehicle detected by the sensor, and then outputs a signal including the tentative vehicle number and absolute-coordinate-system positional information of the detected vehicle;
a vehicle number management PC to which a vehicle number possessed by the vehicle is inputted; and
edge computing that replaces the tentative vehicle number outputted from the vehicle tracking sensor system by the vehicle number outputted from the vehicle number management PC, when the vehicle completes parking,
wherein the edge computing outputs a signal including the replaced vehicle number of the vehicle that has completed parking and the absolute-coordinate-system positional information of the vehicle.

(Appendix 2) The vehicle tracking system according to (Appendix 1), wherein the edge computing includes
a tracking processing unit that performs tracking processing for the vehicle, based on a signal outputted from the vehicle tracking sensor system, and outputs a signal including the tentative vehicle number of a vehicle that is a subject of the tracking processing and absolute-coordinate-system positional information of the vehicle that is a subject of the tracking processing,
a parking-slot-information storage unit that outputs a signal including positional information of a parking slot in the area,
a parking completion determination unit that outputs a signal including absolute-coordinate-system positional information of a vehicle that has completed parking in the parking slot and the tentative vehicle number, and
a collation unit that collates a signal outputted from the parking completion determination unit with a signal outputted from the vehicle number management PC and then outputs a signal including the replaced vehicle number and absolute-coordinate-system positional information of the vehicle.

(Appendix 3) The vehicle tracking system according to (Appendix 2), wherein in the case where a difference between the positional information of the parking slot and the absolute-coordinate-system positional information of the vehicle, included in a signal outputted from the tracking processing unit, is the same as or smaller than a predetermined value, the parking completion determination unit determines that the parking has been completed.

(Appendix 4) The vehicle tracking system according to (Appendix 2), wherein in the case where a difference between the positional information of the parking slot and the absolute-coordinate-system positional information of the vehicle, included in a signal outputted from the tracking processing unit, is larger than a predetermined value, the parking completion determination unit determines that the parking has not been completed.

(Appendix 5) A vehicle tracking system for tracking a vehicle existing in a predetermined area, comprising:
- a vehicle tracking sensor system that has a sensor counter that counts up every predetermined period and a sensor for detecting the vehicle, provides a tentative vehicle number to a vehicle detected by the sensor, and then outputs a signal including the tentative vehicle number, absolute-coordinate-system positional information of the detected vehicle, and counter information indicating a counting state of the sensor counter;
- a vehicle number management PC to which a vehicle number possessed by the vehicle is inputted;
- a system-abnormal-time vehicle number inputting PC to which a vehicle number possessed by the vehicle and absolute-coordinate-system positional information of the vehicle are inputted at a system abnormality time when an abnormality occurs in the vehicle tracking sensor system; and
- edge computing that replaces, at the system abnormality time, the tentative vehicle number outputted from the vehicle tracking sensor system by the vehicle number outputted from the system-abnormal-time vehicle number inputting PC,
- wherein the edge computing outputs a signal including the replaced vehicle number and the absolute-coordinate-system positional information of the vehicle.

(Appendix 6) The vehicle tracking system according to (Appendix 5),
- wherein the edge computing includes
  - a tracking processing unit that performs tracking processing for the vehicle, based on a signal outputted from the vehicle tracking sensor system, and outputs a signal including the tentative vehicle number of a vehicle that is a subject of the tracking processing and absolute-coordinate-system positional information of the vehicle,
  - a parking-slot-information storage unit that outputs a signal including positional information of a parking slot in the area,
  - a parking completion determination unit that outputs a signal including absolute-coordinate-system positional information of a vehicle that has completed parking in the parking slot and the tentative vehicle number,
  - a collation unit that collates a signal outputted from the parking completion determination unit with a signal outputted from the vehicle number management PC and then outputs a signal including the replaced vehicle number and absolute-coordinate-system positional information of the vehicle, and
  - a system abnormality determination unit that determines whether or not the system abnormality exists,
- wherein the system abnormality determination unit includes
  - a sensor counter abnormality determination unit that determines an abnormality in the sensor counter,
  - a controller unit power-source abnormality determination unit that determines a power-source abnormality in a controller unit included in the edge computing,
  - a sensor signal line short-circuiting/short-to-ground abnormality determination unit that determines whether or not a short-circuiting abnormality or a short-to-ground abnormality exists in a signal line of a sensor mounted in the vehicle tracking sensor system,
  - a tracking abnormality determination unit that determines whether or not an abnormality exists in the tracking processing by the tracking processing unit, and
  - a combination unit that combines respective results of the determination by the sensor counter abnormality determination unit, the determination by the controller unit power-source abnormality determination unit, a determination by the sensor signal line short-circuiting/short-to-ground abnormality determination unit, and a determination by the tracking abnormality determination unit,
- wherein in the case were at least one of the determination by the sensor counter abnormality determination unit, the determination by the controller unit power-source abnormality determination unit, a determination by the sensor signal line short-circuiting/short-to-ground abnormality determination unit, and a determination by the tracking abnormality determination unit is a determination that an abnormality exists, the combination unit outputs a signal including an abnormality flag indicting an abnormality, and
- wherein in the case were each of the determination by the sensor counter abnormality determination unit, the determination by the controller unit power-source abnormality determination unit, a determination by the sensor signal line short-circuiting/short-to-ground abnormality determination unit, and a determination by the tracking abnormality determination unit is a determination that no abnormality exists, the combination unit makes the abnormality flag indicting an abnormality unestablished.

(Appendix 7) A vehicle tracking system for tracking a vehicle existing in a predetermined area, comprising:
- a vehicle tracking sensor system (100) that has a sensor counter that counts up every predetermined period and a sensor for detecting the vehicle, provides a tentative vehicle number to a vehicle detected by the sensor, and then outputs a signal including the tentative vehicle number, absolute-coordinate-system positional information of the detected vehicle, and counter information indicating a counting state of the sensor counter;
- a vehicle number management PC (200) to which a vehicle number possessed by the vehicle is inputted;
- a system-abnormal-time vehicle number inputting PC (400) to which a vehicle number possessed by the vehicle and absolute-coordinate-system positional information of the vehicle are inputted at a system abnormality time when an abnormality occurs in the vehicle tracking sensor system (100); and
- edge computing (300) that replaces the tentative vehicle number included in a signal outputted from the vehicle tracking sensor system (100) by the vehicle number included in a signal outputted from the vehicle number management PC (200), at a time when parking of the vehicle is completed, and that replaces the tentative vehicle number included in a signal outputted from the vehicle tracking sensor system (100) by the vehicle number included in a signal outputted from the system-abnormal-time vehicle number inputting PC (400), at a time of the system abnormality, wherein the edge computing (300) outputs a signal including the replaced vehicle number and the absolute-coordinate-system positional information of the vehicle.

(Appendix 8) The vehicle tracking system according to (Appendix 7), further including
a parking-slot-information storage unit that outputs a signal including positional information of a parking slot in the area,
a parking completion determination unit that outputs a signal including absolute-coordinate-system positional information of a vehicle that has completed parking in the parking slot and the tentative vehicle number,
a system abnormality determination unit that determines whether or not an abnormality exists in the vehicle tracking sensor system, and
a collation unit that collates a signal outputted from the parking completion determination unit, a signal outputted from the system abnormality determination unit, a signal outputted from the vehicle number management PC, and a signal outputted from the system-abnormal-time vehicle number inputting PC,
wherein the collation unit has
a normal-time collation unit that collates a signal outputted from the parking completion determination unit with a signal outputted from the vehicle number management PC and then outputs a signal including a vehicle number possessed by the vehicle and absolute-coordinate-system positional information of the vehicle,
an abnormal-time collation unit that collates a signal outputted from the parking completion determination unit with a signal outputted from the system-abnormal-time vehicle number inputting PC and then outputs a signal including a vehicle number for a non-managed vehicle, possessed by the vehicle, and absolute-coordinate-system positional information of the non-managed vehicle, and
a switching unit that performs switching between a signal outputted from the normal-time collation unit and a signal outputted from the abnormal-time collation unit, based on a signal outputted from the system abnormality determination unit, so as to make an output of the collation unit.

(Appendix 9) The vehicle tracking system according to any one of (Appendix 1) through (Appendix 8),
wherein two or sensors are provided, and
wherein a detection coverage of the provided two or more sensors includes all vehicle traveling roads existing in the area.

(Appendix 10) The vehicle tracking system according to any one of (Appendix 1) through (Appendix 9),
wherein the area is a distribution facility,
wherein the vehicle is a trailer towed by a tractor, and
wherein the trailer is a cargo transporting trailer on which cargoes are mounted.

What is claimed is:

1. A vehicle tracking system for tracking a vehicle existing in a predetermined area, comprising:
a vehicle tracking sensor system that has a sensor for detecting the vehicle, provides a tentative vehicle number to the vehicle detected by the sensor, and then outputs a signal including the tentative vehicle number and absolute-coordinate-system positional information of the detected vehicle;
a vehicle number management PC to which a vehicle number possessed by the vehicle is inputted; and
edge computing that replaces the tentative vehicle number outputted from the vehicle tracking sensor system by the vehicle number outputted from the vehicle number management PC, when the vehicle completes parking,
wherein the edge computing outputs a signal including the replaced vehicle number of the vehicle that has completed parking and the absolute-coordinate-system positional information of the vehicle.

2. The vehicle tracking system according to claim 1, wherein the edge computing includes
a tracking processor that performs tracking processing for the vehicle, based on a signal outputted from the vehicle tracking sensor system, and outputs a signal including the tentative vehicle number of a vehicle that is a subject of the tracking processing and absolute-coordinate-system positional information of the vehicle that is a subject of the tracking processing,
a parking-slot-information storage memory that outputs a signal including positional information of a parking slot in the area,
a parking completion determiner that outputs a signal including absolute-coordinate-system positional information of a vehicle that has completed parking in the parking slot and the tentative vehicle number, and
a collator that collates a signal outputted from the parking completion determiner with a signal outputted from the vehicle number management PC and then outputs a signal including the replaced vehicle number and absolute-coordinate-system positional information of the vehicle.

3. The vehicle tracking system according to claim 1,
wherein two or more sensors are provided, and
wherein a detection coverage of the provided two or more sensors includes all vehicle traveling roads existing in the area.

4. The vehicle tracking system according to claim 1,
wherein the area is a distribution facility,
wherein the vehicle is a trailer towed by a tractor, and
wherein the trailer is a cargo transporting trailer on which cargoes are mounted.

5. The vehicle tracking system according to claim 3,
wherein the area is a distribution facility,
wherein the vehicle is a trailer towed by a tractor, and
wherein the trailer is a cargo transporting trailer on which cargoes are mounted.

6. The vehicle tracking system according to claim 2, wherein in the case where a difference between the positional information of the parking slot and the absolute-coordinate-system positional information of the vehicle, included in a signal outputted from the tracking processor, is the same as or smaller than a predetermined value, the parking completion determiner determines that the parking has been completed.

7. The vehicle tracking system according to claim 2, wherein in the case where a difference between the positional information of the parking slot and the absolute-coordinate-system positional information of the vehicle, included in a signal outputted from the tracking processor, is larger than a predetermined value, the parking completion determiner determines that the parking has not been completed.

8. The vehicle tracking system according to claim 2,
wherein two or more sensors are provided, and wherein a detection coverage of the provided two or more sensors includes all vehicle traveling roads existing in the area.

9. The vehicle tracking system according to claim 6, wherein two or more sensors are provided, and
wherein a detection coverage of the provided two or more sensors includes all vehicle traveling roads existing in the area.

10. The vehicle tracking system according to claim 7, wherein two or more sensors are provided, and
wherein a detection coverage of the provided two or more sensors includes all vehicle traveling roads existing in the area.

11. A vehicle tracking system for tracking a vehicle existing in a predetermined area, comprising:
a vehicle tracking sensor system that has a sensor counter that counts up every predetermined period and a sensor for detecting the vehicle, provides a tentative vehicle number to a vehicle detected by the sensor, and then outputs a signal including the tentative vehicle number, absolute-coordinate-system positional information of the detected vehicle, and counter information indicating a counting state of the sensor counter;
a vehicle number management PC to which a vehicle number possessed by the vehicle is inputted;
a system-abnormal-time vehicle number inputting PC to which a vehicle number possessed by the vehicle and absolute-coordinate-system positional information of the vehicle are inputted at a system abnormality time when an abnormality occurs in the vehicle tracking sensor system; and
edge computing that replaces, at the system abnormality time, the tentative vehicle number outputted from the vehicle tracking sensor system by the vehicle number outputted from the system-abnormal-time vehicle number inputting PC,
wherein the edge computing outputs a signal including the replaced vehicle number and the absolute-coordinate-system positional information of the vehicle.

12. The vehicle tracking system according to claim 11, wherein the edge computing includes
a tracking processor that performs tracking processing for the vehicle, based on a signal outputted from the vehicle tracking sensor system, and outputs a signal including the tentative vehicle number of a vehicle that is a subject of the tracking processing and absolute-coordinate-system positional information of the vehicle,
a parking-slot-information storage memory that outputs a signal including positional information of a parking slot in the area,
a parking completion determiner that outputs a signal including absolute-coordinate-system positional information of a vehicle that has completed parking in the parking slot and the tentative vehicle number,
a collator that collates a signal outputted from the parking completion determiner with a signal outputted from the vehicle number management PC and then outputs a signal including the replaced vehicle number and absolute-coordinate-system positional information of the vehicle, and
a system abnormality determiner that determines whether or not the system abnormality exists,
wherein the system abnormality determiner includes
a sensor counter abnormality determiner that determines an abnormality in the sensor counter,
a controller power-source abnormality determiner that determines a power-source abnormality in a controller included in the edge computing,
a sensor signal line short-circuiting/short-to-ground abnormality determiner that determines whether or not a short-circuiting abnormality or a short-to-ground abnormality exists in a signal line of a sensor mounted in the vehicle tracking sensor system,
a tracking abnormality determiner that determines whether or not an abnormality exists in the tracking processing by the tracking processor, and
a combiner that combines respective results of the determination by the sensor counter abnormality determiner, the determination by the controller power-source abnormality determiner, a determination by the sensor signal line short-circuiting/short-to-ground abnormality determiner, and a determination by the tracking abnormality determiner,
wherein in the case were at least one of the determination by the sensor counter abnormality determiner, the determination by the controller power-source abnormality determiner, a determination by the sensor signal line short-circuiting/short-to-ground abnormality determiner, and a determination by the tracking abnormality determiner is a determination that an abnormality exists, the combiner outputs a signal including an abnormality flag indicting an abnormality, and
wherein in the case were each of the determination by the sensor counter abnormality determiner, the determination by the controller power-source abnormality determiner, a determination by the sensor signal line short-circuiting/short-to-ground abnormality determiner, and a determination by the tracking abnormality determiner is a determination that no abnormality exists, the combiner makes the abnormality flag indicting an abnormality unestablished.

13. The vehicle tracking system according to claim 11, wherein two or more sensors are provided, and
wherein a detection coverage of the provided two or more sensors includes all vehicle traveling roads existing in the area.

14. The vehicle tracking system according to claim 12, wherein two or more sensors are provided, and
wherein a detection coverage of the provided two or more sensors includes all vehicle traveling roads existing in the area.

15. The vehicle tracking system according to claim 11, wherein the area is a distribution facility,
wherein the vehicle is a trailer towed by a tractor, and
wherein the trailer is a cargo transporting trailer on which cargoes are mounted.

16. The vehicle tracking system according to claim 13, wherein the area is a distribution facility,
wherein the vehicle is a trailer towed by a tractor, and
wherein the trailer is a cargo transporting trailer on which cargoes are mounted.

17. A vehicle tracking system for tracking a vehicle existing in a predetermined area, comprising:
a vehicle tracking sensor system that has a sensor counter that counts up every predetermined period and a sensor for detecting the vehicle, provides a tentative vehicle number to a vehicle detected by the sensor, and then outputs a signal including the tentative vehicle number, absolute-coordinate-system positional information of the detected vehicle, and counter information indicating a counting state of the sensor counter;

a vehicle number management PC to which a vehicle number possessed by the vehicle is inputted;

a system-abnormal-time vehicle number inputting PC to which a vehicle number possessed by the vehicle and absolute-coordinate-system positional information of the vehicle are inputted at a system abnormality time when an abnormality occurs in the vehicle tracking sensor system; and edge computing that replaces the tentative vehicle number included in a signal outputted from the vehicle tracking sensor system by the vehicle number included in a signal outputted from the vehicle number management PC, at a time when parking of the vehicle is completed, and that replaces the tentative vehicle number included in a signal outputted from the vehicle tracking sensor system by the vehicle number included in a signal outputted from the system-abnormal-time vehicle number inputting PC, at a time of the system abnormality, wherein the edge computing outputs a signal including the replaced vehicle number and the absolute-coordinate-system positional information of the vehicle.

18. The vehicle tracking system according to claim 17, further including a parking-slot-information storage memory that outputs a signal including positional information of a parking slot in the area, a parking completion determiner that outputs a signal including absolute-coordinate-system positional information of a vehicle that has completed parking in the parking slot and the tentative vehicle number, a system abnormality determiner that determines whether or not an abnormality exists in the vehicle tracking sensor system, and a collator that collates a signal outputted from the parking completion determiner, a signal outputted from the system abnormality determiner, a signal outputted from the vehicle number management PC, and a signal outputted from the system-abnormal-time vehicle number inputting PC, wherein the collator has a normal-time collator that collates a signal outputted from the parking completion determiner with a signal outputted from the vehicle number management PC and then outputs a signal including a vehicle number possessed by the vehicle and absolute-coordinate-system positional information of the vehicle, an abnormal-time collator that collates a signal outputted from the parking completion determiner with a signal outputted from the system-abnormal-time vehicle number inputting PC and then outputs a signal including a vehicle number for a non-managed vehicle, possessed by the vehicle, and absolute-coordinate-system positional information of the non-managed vehicle, and a switcher that performs switching between a signal outputted from the normal-time collator and a signal outputted from the abnormal-time collator, based on a signal outputted from the system abnormality determiner, so as to make an output of the collator.

19. The vehicle tracking system according to claim 17, wherein two or more sensors are provided, and wherein a detection coverage of the provided two or more sensors includes all vehicle traveling roads existing in the area.

20. The vehicle tracking system according to claim 18, wherein two or more sensors are provided, and wherein a detection coverage of the provided two or more sensors includes all vehicle traveling roads existing in the area.

\* \* \* \* \*